United States Patent
Berrak et al.

(10) Patent No.: US 7,578,918 B2
(45) Date of Patent: Aug. 25, 2009

(54) PROCESS AND APPARATUS FOR TREATING SLUDGE

(75) Inventors: Abderrazak Berrak, Sherbrooke (CA); Abderrahmane Dermoune, Sherbrooke (CA)

(73) Assignee: GL&V Canada Inc., Montreal (CA)

( * ) Notice: Subject to any disclaimer, the term of this patent is extended or adjusted under 35 U.S.C. 154(b) by 843 days.

(21) Appl. No.: 10/915,491

(22) Filed: Aug. 11, 2004

(65) Prior Publication Data

US 2005/0199499 A1    Sep. 15, 2005

(30) Foreign Application Priority Data

Aug. 11, 2003 (CA) ..................................... 2437245

(51) Int. Cl.
  *B01D 61/42* (2006.01)
  *B01D 57/02* (2006.01)
(52) U.S. Cl. .................. 204/553; 204/648; 204/649; 204/650
(58) Field of Classification Search .................. 204/553, 204/648, 649, 650
  See application file for complete search history.

(56) References Cited

U.S. PATENT DOCUMENTS

| 4,100,068 | A | 7/1978 | Jordan et al. |
| 4,244,804 | A | 1/1981 | Moeglich |
| 4,376,022 | A | 3/1983 | Porta et al. |
| 4,861,496 | A | 8/1989 | Diaz |
| 4,877,503 | A | 10/1989 | Candor |
| 5,019,230 | A | 5/1991 | Candor |
| 5,362,371 | A | * | 11/1994 | Candor ........................ 204/542 |
| 5,401,375 | A | * | 3/1995 | Yamaguchi et al. ......... 204/649 |
| 5,891,342 | A | | 4/1999 | Tije |
| 5,922,209 | A | | 7/1999 | Yoshida et al. |
| 6,871,744 | B2 | | 11/2001 | Miller et al. |
| 2003/0150789 | A1 | | 8/2003 | Miller et al. |
| 2005/0016870 | A1 | | 1/2005 | Berrak et al. |

FOREIGN PATENT DOCUMENTS

CA    1309970    11/1992

(Continued)

OTHER PUBLICATIONS

Gingerich et al., Electroosmotically Enhanced Sludge Pressure Filtration, *Water Environment Research*, vol. 71, No. 3, pp. 267-276, (May/Jun. 1999).

(Continued)

*Primary Examiner*—Arun S Phasge

(57) ABSTRACT

The present invention relates to an apparatus for treating sludge comprising electrodes including at least one anode and at least one cathode. The electrodes define therebetween a space adapted to receive the sludge so as to submit the sludge disposed within the space to an electric current, thereby dehydrating the sludge and generating an effluent. The apparatus also comprises an inlet for receiving the sludge and an outlet for evacuating the treated sludge. The inlet and the outlet are in communication with the space. The apparatus also comprises compression means for compacting the sludge so as to permit a contact substantially constant between the electrodes and the sludge when the sludge is submitted to the electric current and rotated around a rotation axis. The invention also relates to a process for treating sludge. The invention is useful for treating various types of sludge in order to dehydrate and decontaminate the sludge.

11 Claims, 18 Drawing Sheets

FOREIGN PATENT DOCUMENTS

| | | |
|---|---|---|
| CA | 2126549 | 6/1995 |
| CA | 2199389 | 4/1996 |
| CA | 2229642 | 2/1997 |
| CA | 2179476 | 12/1997 |
| CA | 2307724 | 5/1999 |
| CA | 2408971 | 11/2001 |
| CA | 2382357 | 1/2002 |
| CA | 2474727 | 8/2003 |
| CA | 2423213 | 9/2004 |
| CA | 2460627 | 9/2004 |
| CA | 2474176 | 11/2004 |
| EP | 0 480 835 | 4/1992 |
| EP | 0 534 861 | 3/1993 |
| JP | 60114315 | 6/1985 |

OTHER PUBLICATIONS

DE 12 47 982 B (The Motherwell Bridge and Engineering Company Limited) Aug. 24, 1967.
WO 98/50626 A (KOHL, ALOIS) Nov. 12, 1998.
DE 42 15 061 A1 (ASEA Brown Boveri AG, Baden, Aargau CH) Feb. 4, 1993.
English Abstract of CN 1485282A, published on Mar. 3, 2004.
English Abstract of JP 56002817A, published on Jan. 13, 1981.
English Abstract of JP 63264200A, published on Nov. 1, 1988.
English Abstract of KR20040017264, published on Feb. 26, 2004.
English abstract of JP2005219050, published on Aug. 18, 2005.

* cited by examiner

FIG_3

FIG_4

FIG_5

FIG_6

FIG_7

PROCESS AND APPARATUS FOR TREATING SLUDGE

CROSS-REFERENCE TO RELATED APPLICATION

The present application claims priority on Canadian patent application No. 2,437,245 filed on Aug. 11, 2003. The above-mentioned application is incorporated herein by reference in its entirety.

TECHNICAL FIELD

The present invention relates to improvements in the field of sludge treatment. In particular, the invention relates to a process and an apparatus for treating sludge. Such a process and apparatus can be useful for treating various types of sludge.

BACKGROUND OF THE INVENTION

Electro-osmosis relates to the fact that an electrical potential having a direct current causes cations to move from the positive end (anode) toward the negative end (cathode), thereby dragging with it water molecules by a viscous action.

One of the main drawbacks of the electro-osmosis techniques is the drop of potential that occurs at the anode. A drop of potential at the anode can be explained by the decrease of water content of the soil (or sludge) adjacent to the anode. It can also be explained by the decrease of the conductivity of the pore water, by the generated gases during the electrolysis, and by the dissolution of the material constituting the anode. Moreover, a drop of potential can also be explained because of an inappropriate contact between the anode and the soil or sludge. Thus, the voltage gradient which is directly applied to the soil or sludge can only be a fraction of the voltage applied to the electrodes.

The abstract of Japanese Patent No. 60,114,315 discloses a method of dehydrating an organic sludge. In this process, the organic sludge is impregnated with saline and dehydrated by using both compression and electro-osmosis. In particular, the sludge is charged into a cylinder comprising electrodes connected to compressing rods. Each of the electrodes comprises a filter cloth disposed between the sludge and the electrode. Moreover, in this process, the sludge is flocculated by adding flocculants.

U.S. Pat. No. 4,376,022 discloses an apparatus for concentrating an aqueous sludge by electro-osmosis. An electric field is applied to a sludge which is disposed between two electrodes. The sludge is thus treated by electro-osmosis and is continually circulating from top to bottom of the apparatus between the electrodes so as to expel water from the sludge. The electrodes comprise endless belts for moving the sludge, and filter bands disposed between the electrodes and the sludge.

U.S. Pat. No. 5,401,375 describes an electro-endomosis type dehydrator. In this apparatus, the sludge is submitted to a voltage applied between a rotary drum having electrodes on its cylindrical wall and a press belt serving as a cathode. The dehydrator also comprises a filtrating cloth disposed between the press belt and the rotary drum.

U.S. Pat. No. 5,891,342 describes a sludge dewatering process wherein the sludge is first flocculated and then applied to a first pre-dewatering belt wherein the water is drained away under gravity. Then, the sludge undergoes a second pre-dewatering step on another belt before entering into a press zone. In this zone, the sludge is transported between two belts and a force is applied to the sludge.

U.S. published Patent Application 2003/0150789 describes an apparatus for electro-dewatering and recovery of solid material from a solid liquid mixture. The apparatus comprises a rotary drum of cathodic nature and two conveyor belts which are driven around the rotary drum. Adjacent to the rotary drum, one of the conveyor belts moves progressively toward the other belt so as to compress the sludge. The other belt comprises anodic patches and the inner porous conveyor belt is thus disposed between the cathode and the anode.

Gingerich et al. in Water Environment Research, May/June 1999, pages 267-276, Volume 71, Number 3, describe a laboratory unit cell electro-osmosis device used for dewatering sludge. This device comprises a cylinder body including a piston and a bottom support plate, the latter acting as electrodes. The piston is activated by a compressed air inlet and a filter cloth is disposed on the bottom support plate, i.e. between the sludge and the bottom support plate. This document also describes various experimental series that have been made with this device, wherein different values of constant voltage or constant pressure have been tested.

SUMMARY OF THE INVENTION

It is therefore an object of the present invention to provide a process and an apparatus for treating sludge, which would overcome the drawbacks of the prior art.

It is also another object of the present invention to provide a process and an apparatus for treating sludge, which would maintain its efficacy during the whole treatment of the sludge.

It is also another object of the present invention to provide a process and an apparatus for treating sludge, which would permit to optimize the proportion of the voltage gradient which is really applied to the sludge.

It is also another object of the present invention to provide a process and apparatus for treating sludge, which would permit to decontaminate the sludge.

It is also another object of the present invention to provide a process and apparatus for treating sludge, which would permit to dehydrate the sludge and increase its dryness.

According to a first aspect of the invention, there is provided an apparatus for treating sludge comprising:

electrodes including at least one anode and at least one cathode, the electrodes defining therebetween a space adapted to receive the sludge, so as to submit the sludge disposed within the space to an electric current, thereby dehydrating the sludge and generating an effluent;

an inlet for receiving the sludge and an outlet for evacuating the treated sludge, the inlet and outlet being in communication with the space;

compression means for compacting the sludge so as to permit a contact substantially constant between the electrodes and the sludge when the sludge is submitted to the electric current;

evacuation means for evacuating the effluent; and activating means for imparting a rotation movement to the sludge so that the sludge is in rotation around a rotation axis defined by the apparatus while being submitted to the electric current and being compacted.

According to a second aspect of the invention, there is provided an apparatus for treating sludge comprising:

electrodes including at least one anode and at least one cathode, the electrodes defining therebetween a space adapted to receive the sludge, the electrodes having a curved shape or being adapted to adopt a curved shape, and at least one of the electrodes being rotatably mounted within the apparatus so as to rotate around an axis of rotation;

an inlet for receiving the sludge and an outlet for evacuating the treated sludge, the inlet and outlet being in communication with the space;

the space having a decreasing volume from the inlet to the outlet so as to compact the sludge when the sludge is rotated around the axis from the inlet to the outlet, and to permit a substantially constant contact between the electrodes and the sludge when submitting the sludge to an electric current for dehydrating it.

According to a third aspect of the invention, there is provided a process for treating sludge comprising:

introducing the sludge into a space defined between electrodes including at least one anode and at least one cathode, the anode and the cathode being disposed in an apparatus defining a rotation axis; and submitting the sludge to an electric current so as to dehydrate the sludge, and imparting a rotation movement to the sludge around the axis while compacting the sludge so as to permit a substantially constant contact between the sludge and the electrodes when dehydrating the sludge.

It has been found that the apparatuses and processes of the invention permit to treat sludge in a simple an efficient manner. It also has been found that by using the apparatuses and processes of the invention and more particularly by submitting the sludge to an electric current while imparting a rotation movement to the sludge and compacting it, several drawbacks of the prior art can be overcome. In fact, the apparatuses and processes of the invention allow a substantially constant contact between the electrodes and the sludge during the treatment, thereby optimizing the treatment. The apparatuses and processes of the invention are also useful for treating various types of sludge and decontaminate the sludge from various types of pollutants. By using the apparatuses and processes of the present invention, it is possible to efficiently treat sludge by reducing the drops of potential at the electrodes and more particularly at the anode. It also has been found that such apparatuses and processes can be particularly useful for treating sludge having a high level of dryness. Such processes and apparatus can be used to treat sludge without addition of any other additives. Another important advantage is that such processes and apparatus do not require any filter between the sludge and the electrodes.

In the apparatus according to the first aspect of the invention, the evacuation means can comprise orifices formed within at least one wall of the apparatus and within the electrodes, for evacuating the effluent. The evacuation means can further comprise grooves formed within a wall adjacent to at least one of the electrodes, the grooves being in communication with the orifices of the electrodes and the orifices of the at least one wall. The compression means can be characterized in that the space between the electrodes defines a decreasing volume from the inlet toward the outlet.

According to a preferred embodiment, the apparatus of the first aspect of the invention can comprise a substantially cylindrical wall axially extending along the axis. The wall is rotatably mounted on a bottom wall and one of the electrodes is connected to the cylindrical wall. The other electrode is immovably mounted in the apparatus with respect to the bottom wall. Alternatively, the apparatus can also comprise two substantially cylindrical walls axially extending along the axis. One of the walls is disposed inside the other wall. Each of the walls is connected to one of the electrodes, and at least one of the walls is rotatably mounted on a bottom wall.

Preferably, both cylindrical walls are rotatably mounted on the bottom wall. The compression means can comprise a stop disposed on the bottom wall, within the space. The stop permits to partly clog the space thereby compacting the sludge. The inlet and the outlet are preferably formed within the bottom wall. The rotation axis is preferably substantially vertical.

According to another preferred embodiment, the apparatus according to the first aspect of the invention can comprise a rod defining the axis. The first electrode has a radius of curvature and extends axially along the axis, and the second electrode is movable and is disposed between the first electrode and the rod. The movable electrode is rotatably connected to the rod. Adjacently to one end of the rod, a first wall can be disposed perpendicularly to the rod. Adjacently to another end of the rod, a second wall can be disposed perpendicularly to the rod. The apparatus can also comprises a wall having a radius of curvature extending axially along the axis and connected to the first electrode, and to the first and second walls, the second electrode being attached to a support wall which is rotatably mounted on the rod. The second electrode and the support wall can have a substantially cylindrical shape. The activating means can comprise a motor connected to the support wall, thereby imparting a rotation movement to the second electrode and to the sludge. The electrodes can be disposed in an eccentric manner around the axis. Preferably, at least one of the electrodes has a cylindrical shape and the other has at least two segments having different radiuses of curvature. Alternatively, at least one of the electrodes has a cylindrical shape and the electrodes are disposed in an eccentric manner around the axis. The apparatus can further comprise paddles, made of an insulating material such as a polymer or a plastic, for carrying the sludge through the space, from the inlet to the outlet. The paddles are connected to the rod and a portion of the paddles is extending through apertures defined within the second electrode. Preferably, the compression means is characterized in that the space between the first and second electrodes defines a decreasing volume from the inlet toward the outlet, and wherein the paddles are adjustably connected to the rod so as to adjust the length of the portion of the paddle extending in the space in accordance with the decreasing volume. The rotation axis is preferably substantially horizontal.

According to another preferred embodiment, one of the electrodes of the apparatus according to the first aspect of the invention can have the form of an endless belt which is moved around at least a portion of the axis. The other electrode can have a cylindrical shape, and being rotatably mounted within the apparatus. The other electrode is disposed between the axis and the belt. The belt is preferably guided around the portion of axis by means of drive rollers. The cylindrical electrode can comprise a plurality of cells adapted to receive sludge. Each cell comprising two paddles defining side walls of each cell. Each cell also comprises a metal plate acting as an electrode and bottom wall of the cell, and two other side walls. The electrodes are isolated from one another by means of the paddles. The paddles are sealingly engaging the belt, the belt thereby defining a top wall of each cell. Preferably, the anode and the cathode are moving around the axis at a same speed. Alternatively, the anode and the cathode can be moved at different speeds.

In the apparatus according to the second aspect of the invention, the electrodes can be disposed in an eccentric manner around the axis. Preferably, at least one of the electrodes has a cylindrical shape and the other electrode has at least two segments having different radiuses of curvature. Also, at least one of the electrodes can have a cylindrical shape and the electrodes are disposed in an eccentric manner around the axis. When one of the electrodes is adapted to adopt a curved shape, this electrode can be made of a conductive and deformable or flexible material. This electrode can be made of a metal belt comprising orifices.

Preferably, one of the electrodes has the form of an endless belt which is moved around a portion of the axis. The other electrode has a cylindrical shape, and is rotatably mounted within the apparatus. The other electrode is disposed between the axis and the belt. The belt is preferably guided around the portion of axis by means of drive rollers. The cylindrical electrode can comprise a plurality of cells adapted to receive sludge, each cell comprising two paddles defining side walls of each cell, each cell also comprises a metal plate acting as an electrode and bottom wall of the cell, and two other side walls, the electrodes being isolated from one another by means of the paddles, and wherein the paddles are sealingly engaging the belt, the belt thereby defining a top wall of each cell.

Preferably, the endless belt is the cathode and the cylindrical electrode is the anode. The paddles can be adjustably mounted on a rod defining the axis so as to modify the size of each cell. The paddles are adjusted in accordance with the decreasing volume of the space between the two electrodes. The length of a portion of each paddle extending between the electrodes is varying according to the distance between the electrodes. Preferably, the paddles are adjustably mounted on the rod by means of a cam system. The compression means can comprise a guide member disposed adjacently to the endless belt. The guide member contacts the belt so as to permit to reduce the distance between the electrodes from the inlet toward the outlet. The apparatus can further comprising means for controlling the thickness of the sludge which is entering within the space it can be said that this means controls the amount of sludge which is inserted within the space or inside the cells. The electrodes comprise orifices formed therein for evacuating an effluent generated during the treatment. The apparatus can further comprise means for uniformly distributing the sludge into the cells. The apparatus can further comprise a scraper for removing the sludge from the electrode having a cylindrical shape.

In the process according to the third aspect of the invention, the sludge, before the treatment, can have a dryness of about 3 to about 25%, preferably of about 9 to about 20%. The sludge, after the treatment, can have a dryness of at least 25%, preferably at least 35%, and more preferably of at least 40%. Alternatively, the sludge after the treatment can have a dryness comprised between 35 and 45%. The sludge, after the treatment, can have a volume which is about 40 to about 70, preferably about 50 to 67%, less as compared to the volume of the untreated sludge. Alternatively, the volume after treatment can be at least 50 or 60% less than before the treatment. The treatment preferably has a bactericidal effect. In fact, the sludge, after the treatment, can have a content of fecal coliforms which is at least 90% inferior as compared to the content of fecal coliforms of the sludge before the treatment. Alternatively, the content of fecal coliforms which can be about 95% to 100% inferior as compared to the content of fecal coliforms of the sludge before the treatment. Moreover, the sludge after the treatment can have a content of salmonellae which is at least 40%, preferably at least 55%, and more preferably at least 70% inferior as compared to the content of salmonellae of the sludge before the treatment.

The electric current is preferably a direct current having a density of about 10 to about 110 mA/cm$^2$, preferably of about 60 mA/cm$^2$. The electric current is preferably a direct current having a voltage of about 0.5 to about 30 volts/cm, preferably of about 1 to about 15 volts/cm. During the treatment, the temperature of the sludge can be of about 25 to 120° C., preferably of about 30 to 80° C. Preferably, the sludge has a rotation speed of about 1.5 to about 2.5 rounds per hour. The sludge can be compacted by a stopper disposed between the electrodes and partly clogging the space. Preferably, the electrodes are disposed in such a manner so that the space defines a decreasing volume between the electrodes, the sludge being compacted within the decreasing volume. The distance between the electrodes is preferably decreasing so as to compact the sludge. The sludge is preferably compacted by means of the electrodes which are disposed in such a manner so as to define therebetween a decreasing volume. The sludge can be compacted by means of the electrodes which are disposed in such a manner so that the space defines a decreasing volume between, the sludge being compacted within the decreasing volume. Alternatively, the sludge can be compacted by means of a guide member disposed adjacently to one of the electrodes, the guide member contacting the one of the electrodes so as to permit to reduce the distance between the two electrodes. During the process, the sludge can be compacted by a pressure which is applied to it. The pressure preferably varies according to the sludge consistency, the pressure increasing when the sludge consistency is increasing. Preferably, the pressure applied to the sludge is substantially non-existent at the beginning of the treatment, and then, the pressure is progressively increased. During the treatment, the effluent generated can be a cationic effluent having a basic pH. Such an effluent can comprise a plurality of metals in an ionic form. An anionic effluent can also be generated. This effluent can have an acidic pH and can comprise a plurality of acidic pollutants. The process of the third aspect can be carried out by using any one the apparatuses of the invention or their preferred embodiments. These two types of effluents can be recovered as a mixture or separated.

In the apparatuses and the process of the invention, the electrodes can comprise a plurality of orifices or perforations for draining effluents. These orifices can represent between 5 and 25, preferably between 7 and 23% of the surface area of the electrode. The cathode can comprise stainless steel or iron. The anode can comprise stainless steel or inert material. Inert material comprising titanium coated with iridium dioxide can also be used.

In the apparatuses and the process of the invention, the volume between the electrodes can be decreasing from the inlet toward the outlet. Moreover, during the processes, the pressure during the treatment can be increase progressively. Such a progressive increase of the pressure can be generated by the decreasing volume. Preferably, during the treatment, the sludge is in constant contact with the surface of the electrodes which defines the space adapted to receive the sludge. This space is preferably defined by the surface of each electrode between the inlet and the outlet. Moreover, the whole surface of the electrodes defining the space is preferably constantly contacting the sludge. The apparatuses and processes of the invention can be used for increasing the dryness of a sludge, decontaminating a sludge, or environment protection.

BRIEF DESCRIPTION OF THE DRAWINGS

Further features and advantages of the invention will become more readily apparent from the following description of preferred embodiments as illustrated by way of examples in the appended drawings wherein:

FIG. 1 represents an apparatus 10 for treating sludge having a vertical axis. The apparatus 10 has a cylindrical wall 12 which is rotatably mounted on the bottom wall 14 of the apparatus 10. The bottom wall 14 has a rod 16 which is extending vertically from its center. The rod 16 is thus immovable with respect to the bottom wall 14. The apparatus 10 also comprises a cover 17 which is releasably connected to the upper part of the cylindrical wall 12. Another cover 18 is also releasably disposed on the cover 17. In its lower part, the cylindrical wall 12 comprises rolling means such as wheels, rollers, bearings, etc., so as to allow the rotation movement of the wall 12 around the axis defined by the rod 16. In the apparatus 10, the cylindrical wall 12 is rotating around the axis. The bottom wall 14 as well as the rod 16 is immovable.

As shown in FIG. 2, the bottom wall 14 comprises an inlet 19 adapted to receive the sludge, and a slot 20 acting as an outlet for evacuating the sludge after the treatment. The bottom wall 14 also comprises a space 22 adapted to receive the electrodes and the sludge. When the electrodes are disposed within the space 22, these electrodes define another space 50 (see FIG. 3) dimensioned to receive the sludge. The bottom wall 14 further comprises two grooves 24 and 26 adapted to receive effluents generated during the treatment. The grooves 24 and 26 comprise a plurality of orifices 49 (see FIG. 3) for evacuating effluents from the apparatus 10. This apparatus also comprises a compression means such as a stop 28 which is used for compacting the sludge upwardly, and a scraper 30 for removing the sludge compacted between the electrodes thereby facilitating evacuation of the sludge after treatment. Another cylindrical wall 31 (see FIG. 3) comprising a plurality of grooves 37 for evacuating effluents is attached to the wall 12. An electrode 32 comprising orifices 33 is connected to the wall 31. The electrode 32 can be the cathode or the anode, and preferably the cathode. The apparatus 10 also comprises an electrode 34 having orifices 33. The orifices 33 are of the millimeter order. The electrode 34 is connected to a cylindrical wall 36, the upper part of the wall 36 being connected to the upper part of the wall 12. According to FIG. 2, the walls 12 and 36, as well as electrodes 32 and 34, are rotating counterclockwisely. The electrode 34 can be the anode or the cathode, and preferably the anode. The walls 31 and 36 are preferably made of a non-conductive material and comprise a plurality of grooves 37 for evacuating effluents. The wall 36 is connected to a bottom wall 39 made of the same non-conductive material. Such a non-conductive material can be a polymer. Rolling means 38 are also disposed around the rod 16.

Figure 1:
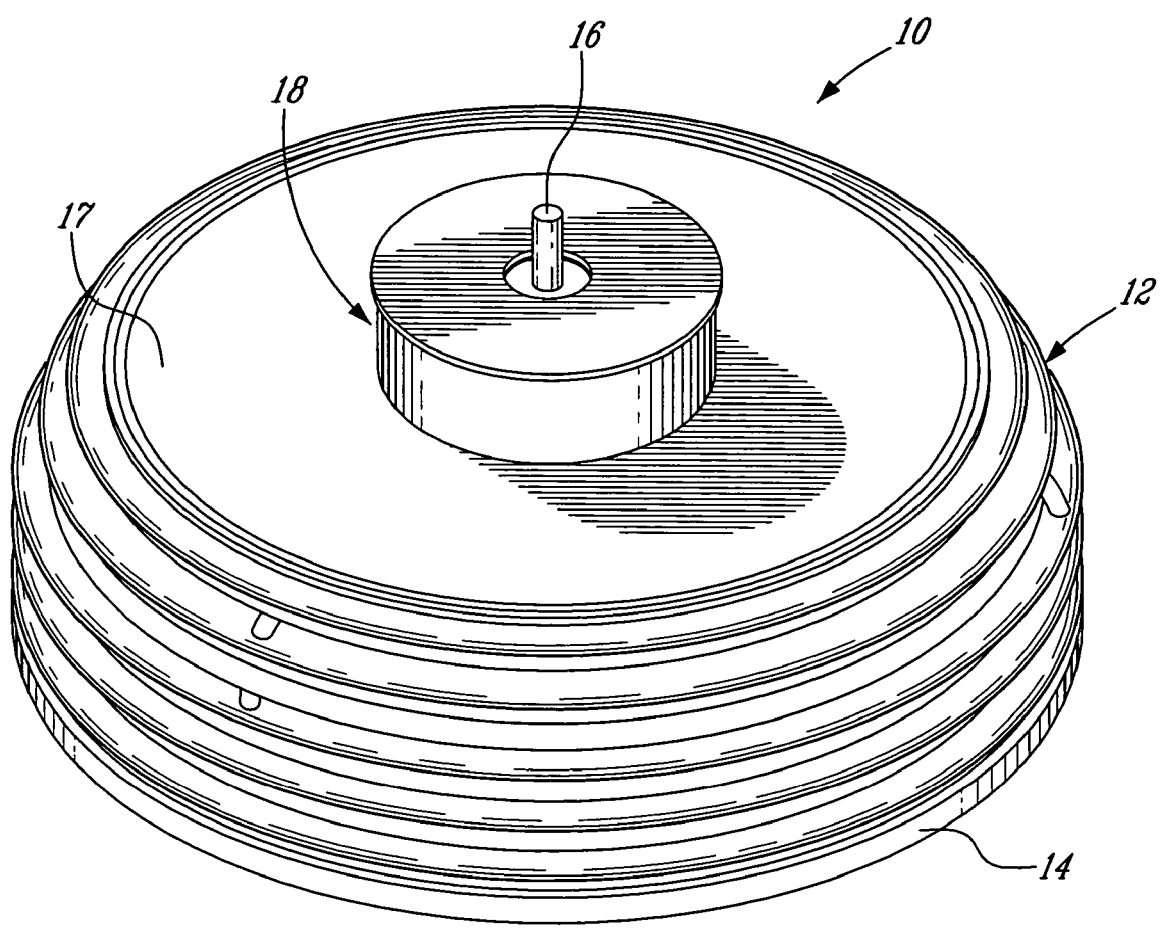
FIG. 1 is a perspective view of an apparatus for treating sludge according to a preferred embodiment of the invention, wherein the apparatus has a vertical rotation axis.

The apparatus 10 also comprises an electrical current distribution device 40 comprising a plate 42 having conductive surfaces 44. The surfaces 44 are connected to a power source (not shown) by means of wires 45. The distribution device 40 also comprises conductive disks 46 and 48 disposed on each side of the plate 40. The disks 46 and 48 are connected together by means of a support (not shown) which is connected to the cover 17. The disks 46 and 48 are connected to the electrodes 34 and 32, respectively, by means of wires (not shown). The distribution device 40 comprises a cover 18.

Figure 3:
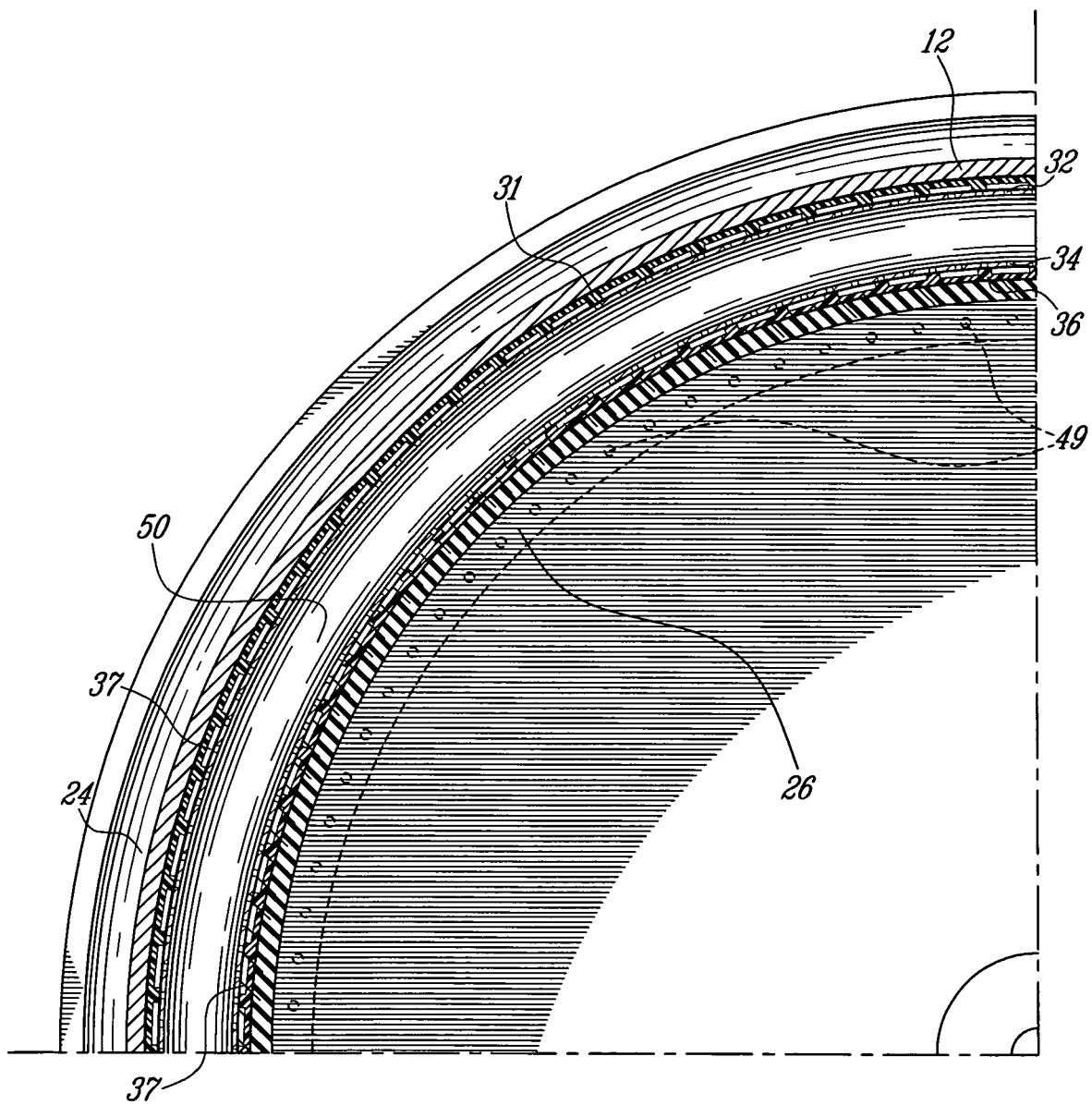
FIG. 3 is a fragmented cross section view of the apparatus shown in FIG. 1.

As shown in FIG. 3, the apparatus comprises, in the following order, from the outside toward the inside, the groove 24, the cylindrical wall 12, the cylindrical wall 31, the electrode 32, the space 50 adapted to receive the sludge, the electrode 34, the cylindrical wall 36, and the groove 26.

Figure 4:
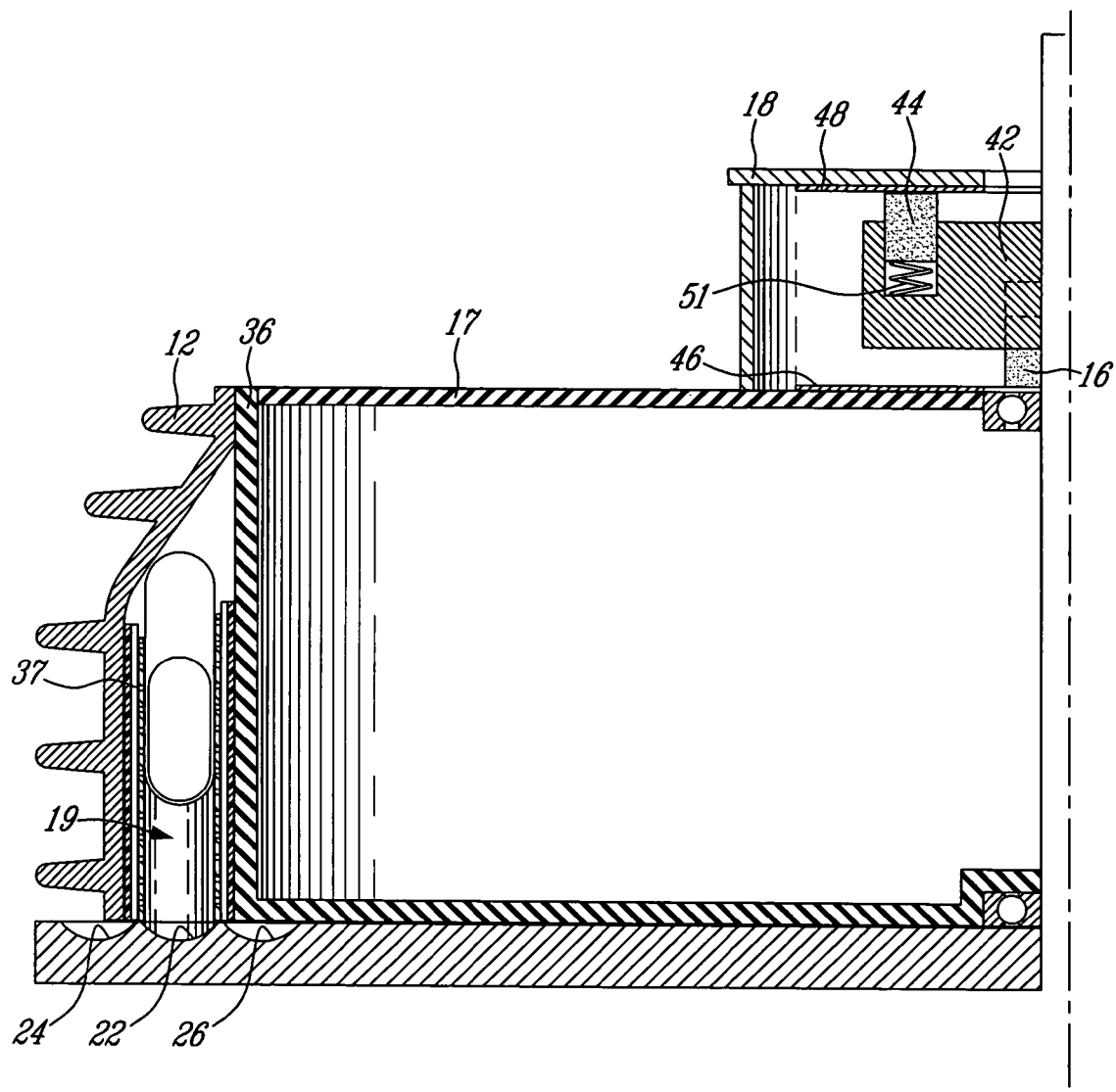
FIG. 4 is another fragmented cross section view of the apparatus shown in FIG. 1.

As shown in FIG. 4, the inlet 19 occupies the whole width of the space 50, and a spring 51 allows a constant contact between the surfaces 44 and the disk 48. All the surfaces 44 comprise such a spring 51 in order to allow a constant contact with the disk 46 or 48, accordingly.

Figure 5:
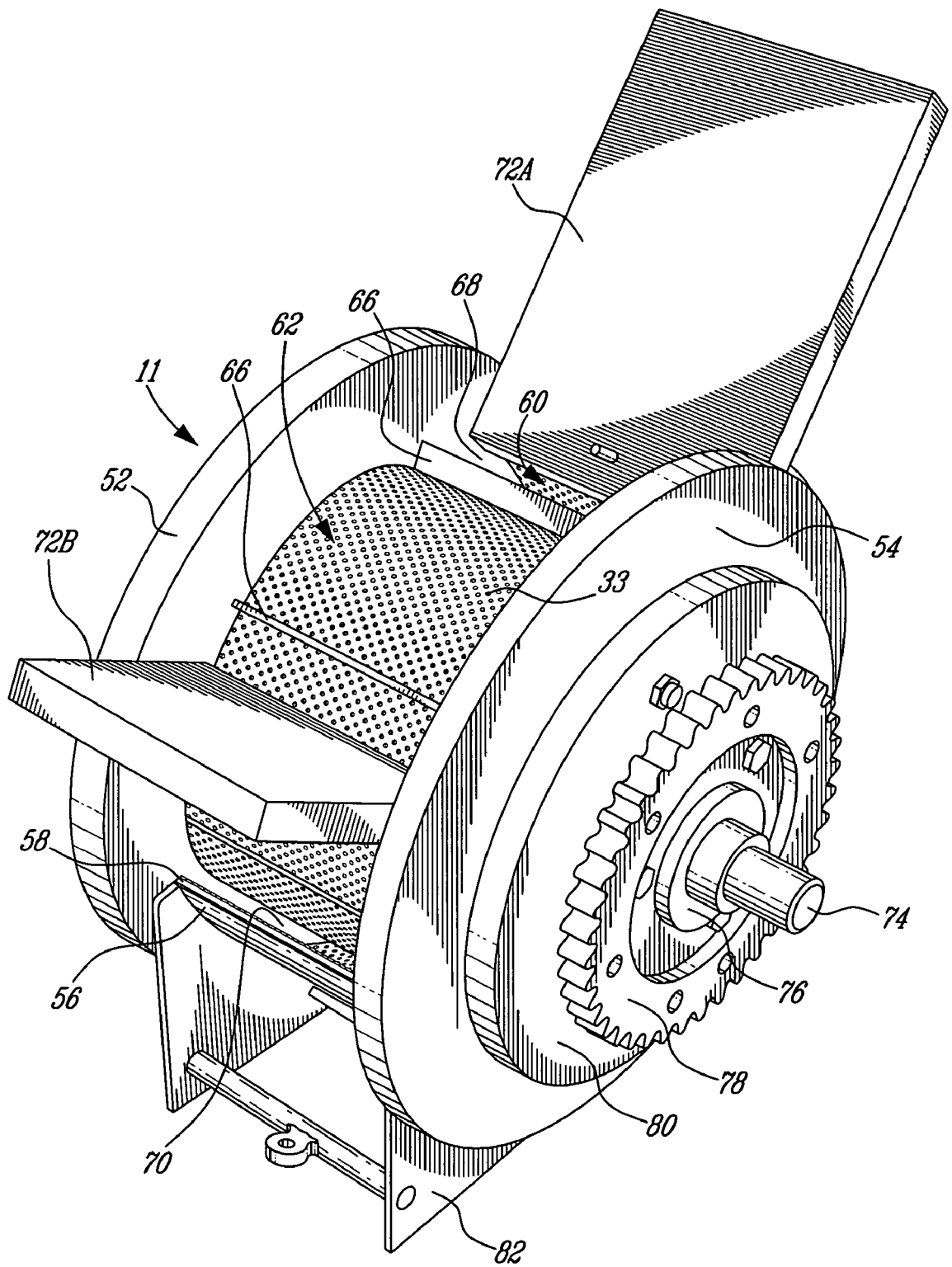
FIG. 5 is a perspective view of an apparatus for treating sludge according to another preferred embodiment of the invention, wherein the apparatus has a horizontal rotation axis.

FIG. 5 shows an apparatus 11 having a horizontal axis of rotation. The apparatus 11 comprises circular walls 52 and 54 disposed at each end of a wall 56 having a radius of curvature (see FIG. 9). Another wall 58 made of a non-conductive material and having substantially the same radius of curvature as the wall 56, is attached to the latter. An electrode 60 having substantially the same radius of curvature as wall 58 is attached to the latter. The apparatus 11 also comprises an electrode 62 connected to a cylindrical wall 64 (shown in FIG. 9) made of a non-conductive material. The cylindrical wall 64 is attached to a cylindrical support 65 (shown in FIG. 9). The walls 58 and 64 also comprise grooves 37' (see FIG. 10). The electrode 62 also comprises paddles 66 for carrying the sludge from the inlet toward the outlet. The electrodes 60 and 62 comprise a plurality of orifices 33. The electrodes 60 and 62 define an inlet 68 and an outlet 70. According to FIG. 5 the electrode 62 is rotating clockwise. Plates 72A and 72B are disposed in order to facilitate loading of the apparatus. Moreover, plates 72B allow preventing mixing together the treated sludge and the non-treated sludge. The support 65 (see FIG. 9) is rotatably mounted on a central rod 74. The apparatus 11 also comprises rolling means 76 and a gear 78 allowing transmission of the rotation movement to the support 65. Preferably, the electrode 60 is the cathode and the electrode 62 is the anode. The apparatus also comprises other walls 80 and a supporting member 82.

Figure 2:
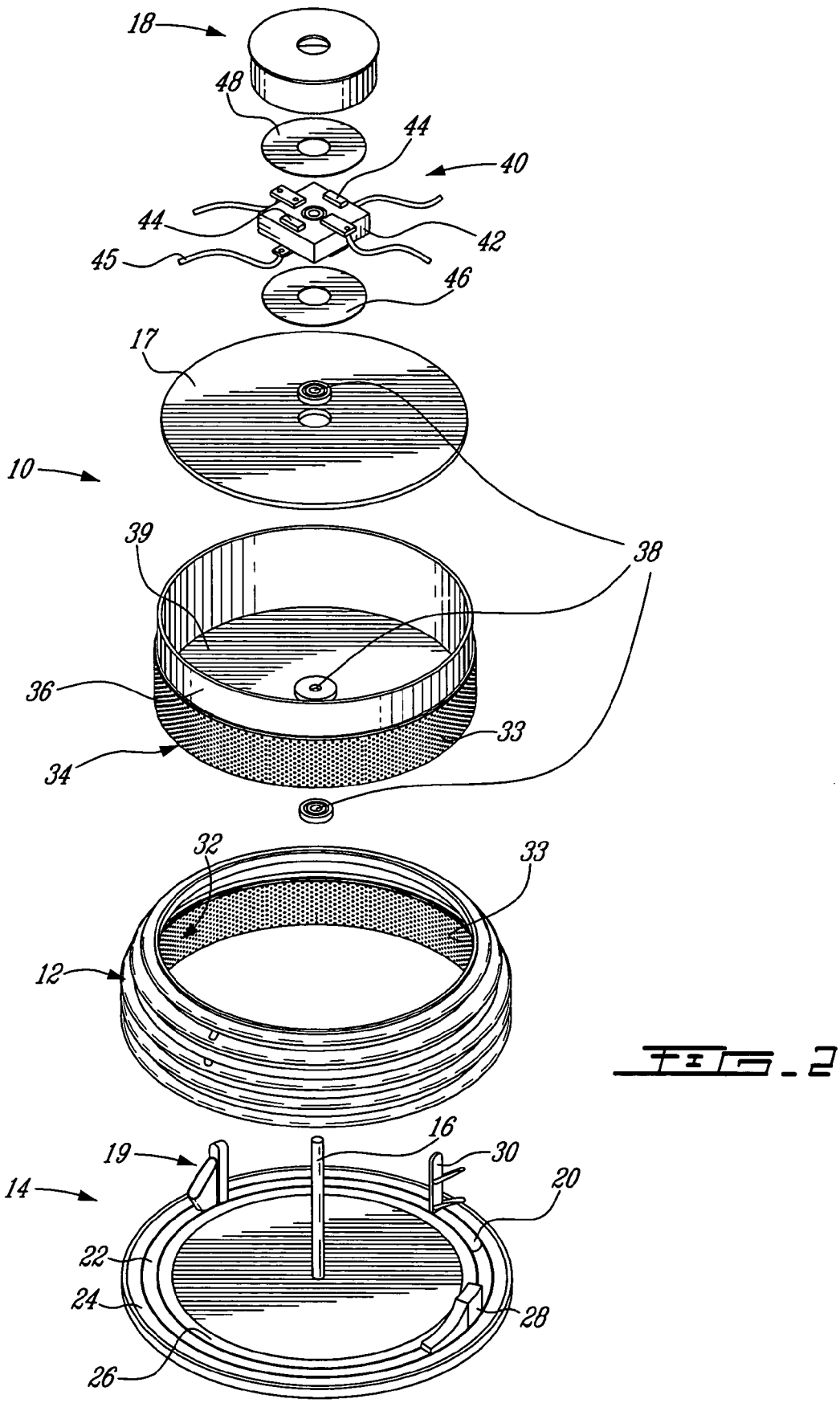
FIG. 2 is an exploded view of the apparatus shown in FIG. 1.
Figure 6:
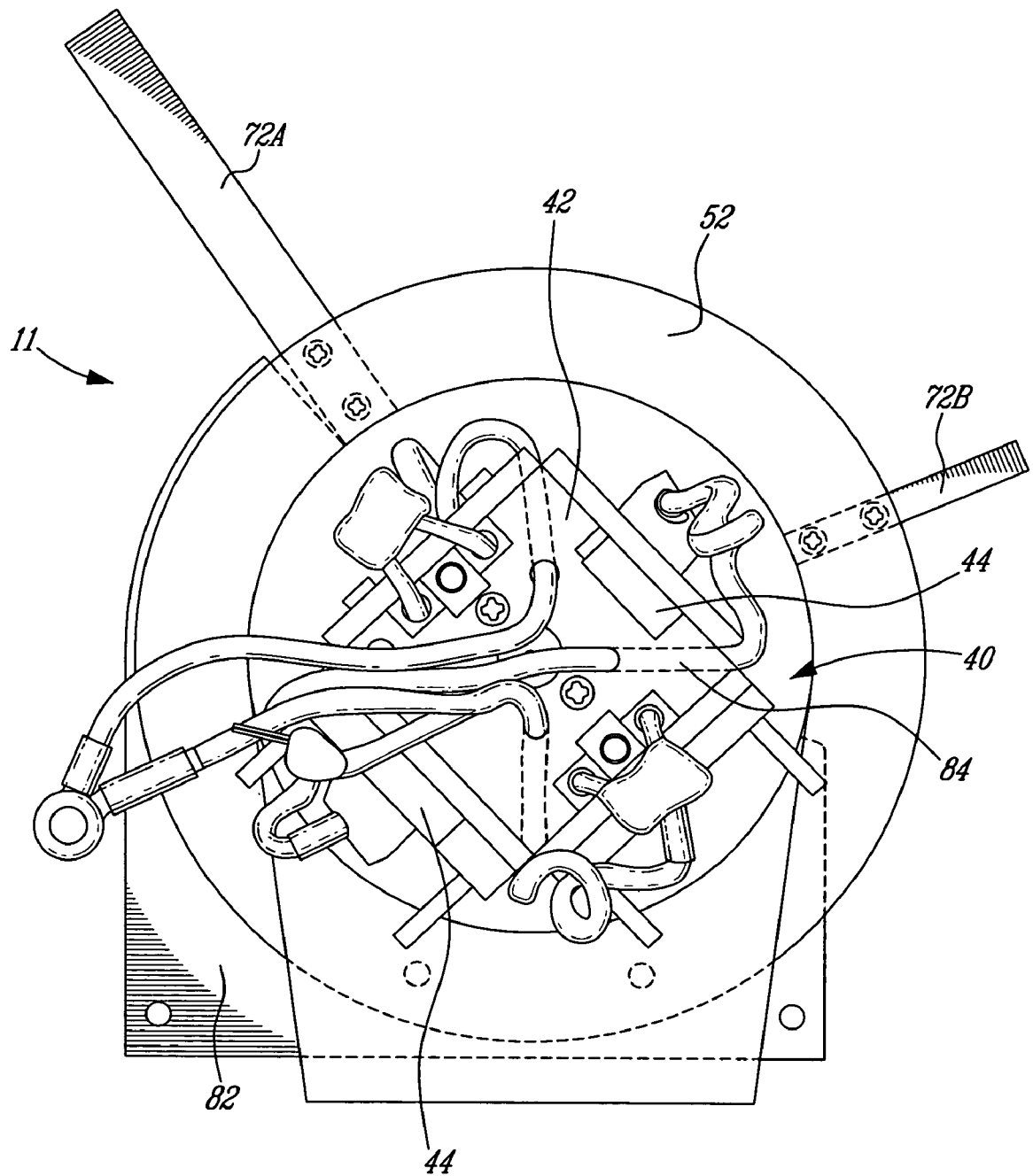
FIG. 6 is a side elevation view of the apparatus shown in FIG. 5.

As shown in FIG. 6, the apparatus 11 comprises an electrical current distribution device 40 as shown in FIG. 2. However, in the case of FIG. 6, the wires 84 connect together the surfaces 44 and a power source (not shown). Moreover, in this case, only the disk 46 (shown in FIG. 7) is necessary because only the electrode 62 is movable. Therefore, electrode 60 can be directly connected to the power source.

Figure 7:
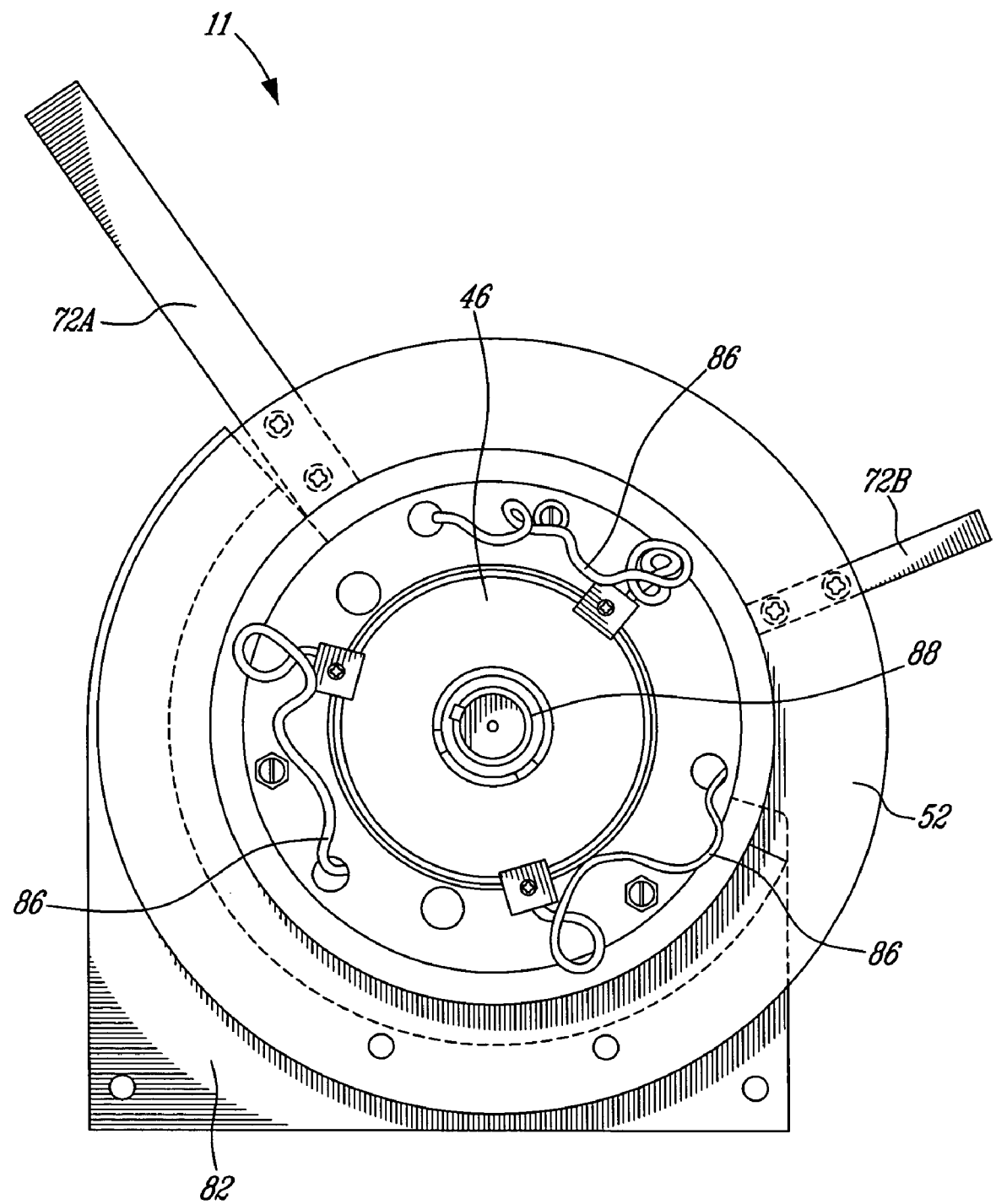
FIG. 7 is another side elevation view of the apparatus shown in FIG. 5, wherein a plate comprising conductive surface has been removed.

As shown in FIG. 7, the apparatus 11 comprises a disk 46 which is connected to the electrode 62 by means of the wires 86.

Figure 8:
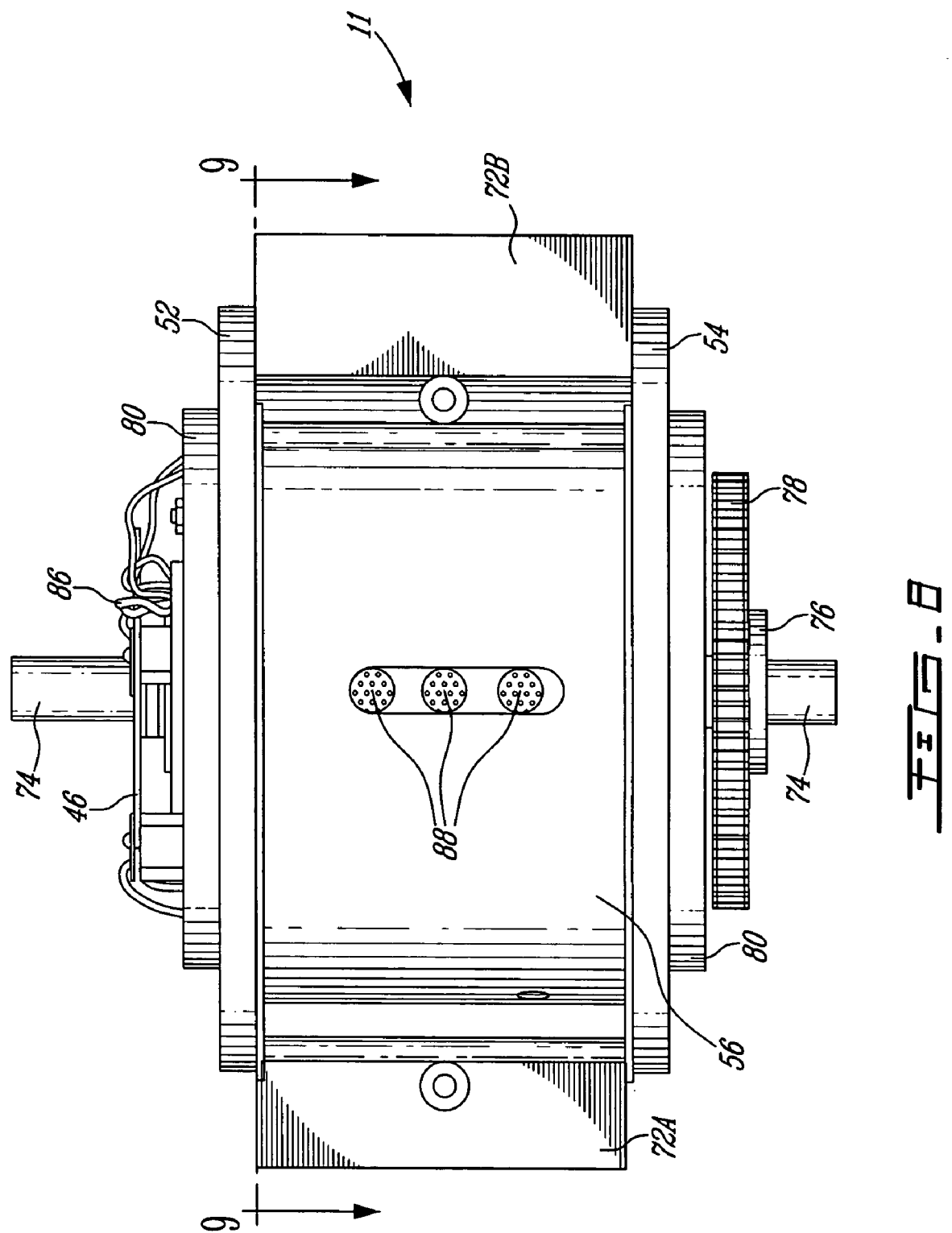
FIG. 8 is a bottom view of the apparatus shown in FIG. 5.

As shown in FIG. 8, the apparatus 11 comprises orifices 88 formed in the wall 56 so as to evacuate effluents from this apparatus.

Figure 9:
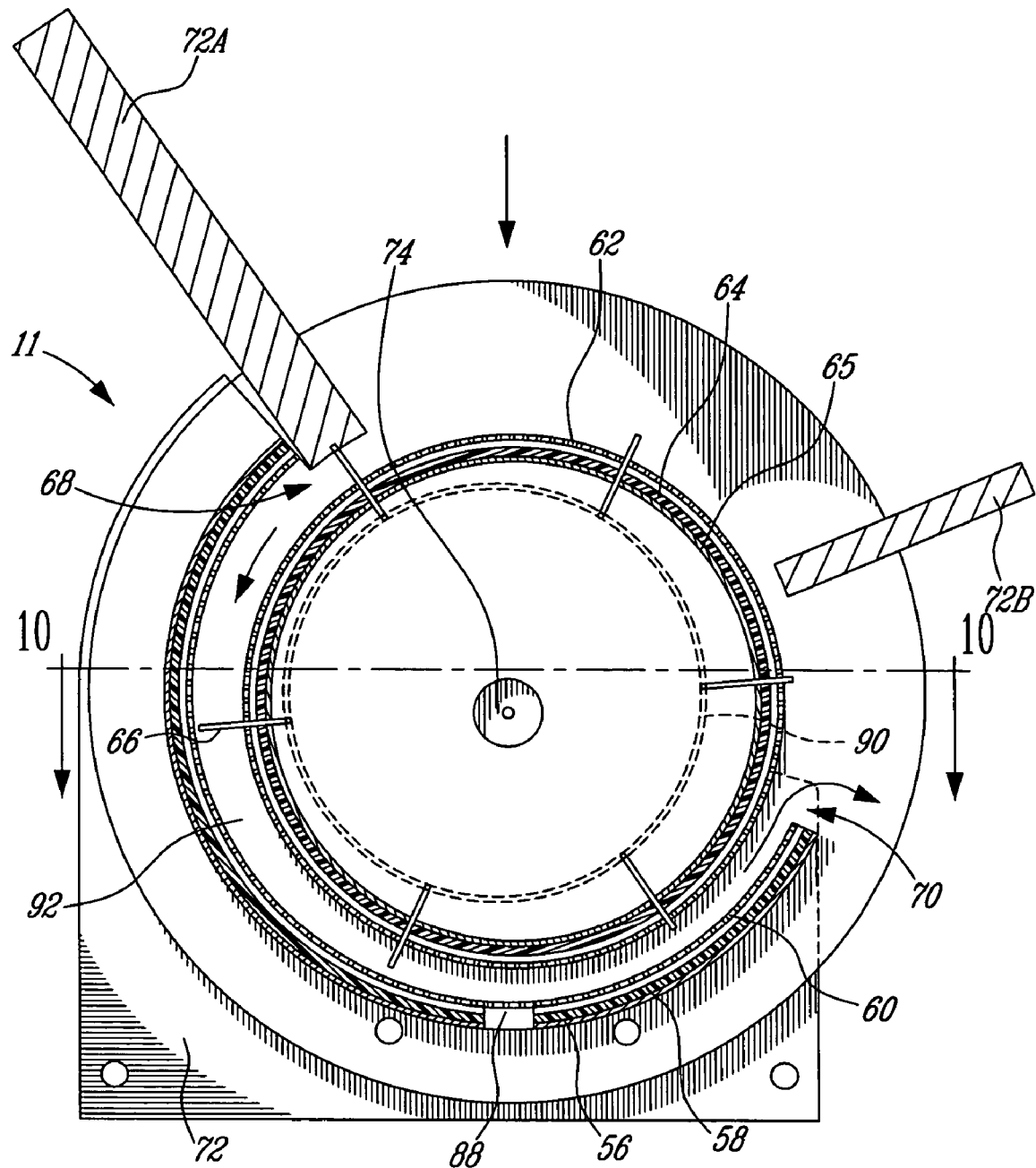
FIG. 9 is cross section view of the apparatus shown in FIG. 8, taken along the line 9-9.
Figure 10:
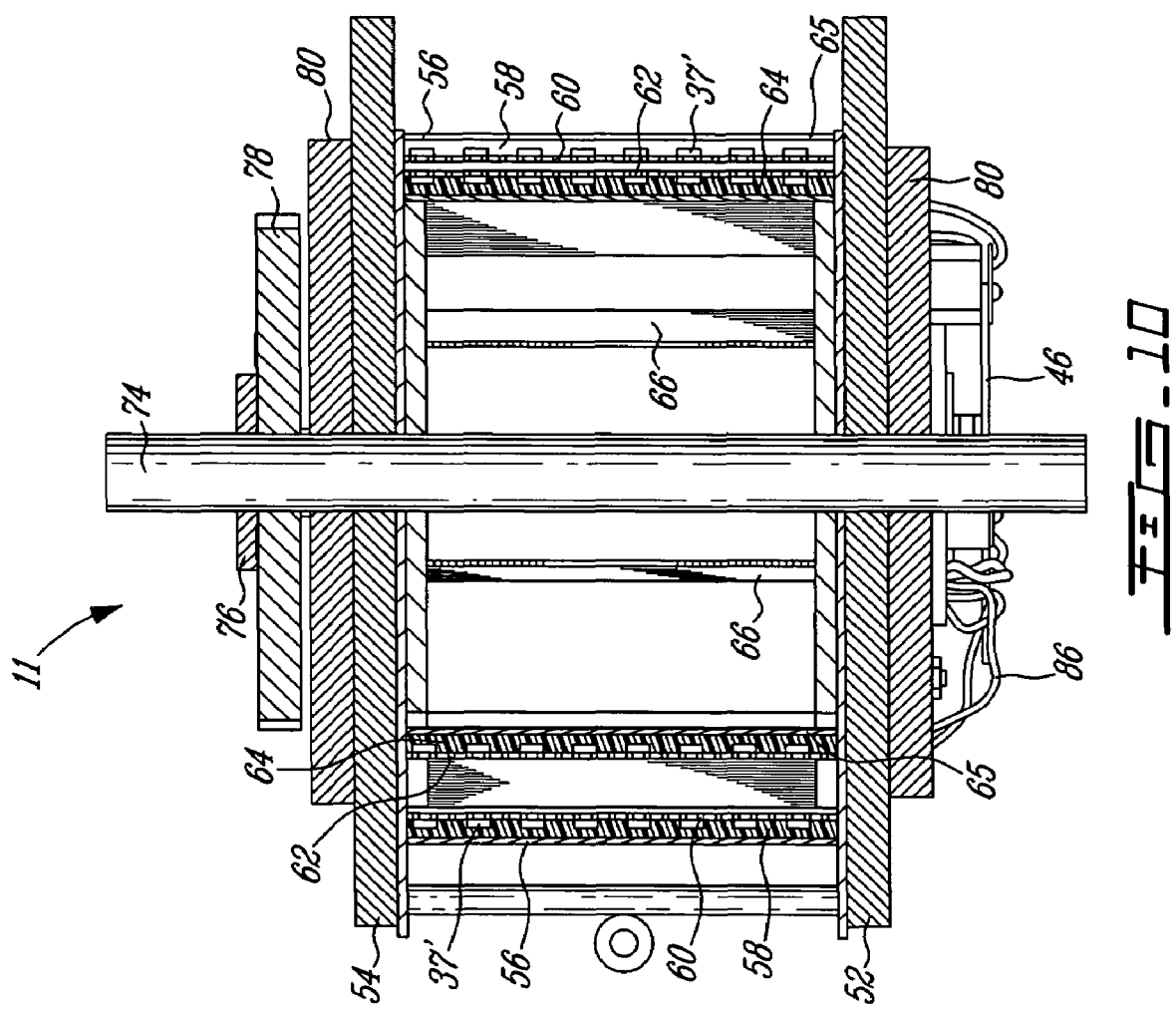
FIG. 10 is cross section view of the apparatus shown in FIG. 9, taken along the line 10-10.

As shown in FIG. 9, the apparatus 11 comprises a cam system 90 which allows to adjust a portion of the length of the paddles 66 which is extending in the space 92 adapted to receive the sludge. In fact, the paddles 66 are adjusted according to the decreasing volume (or distance between the electrodes) from the inlet 68 toward the outlet 70. Such a decreasing volume or distance is clearly seen in the cross sections shown in FIGS. 9 and 10.

Figure 11:
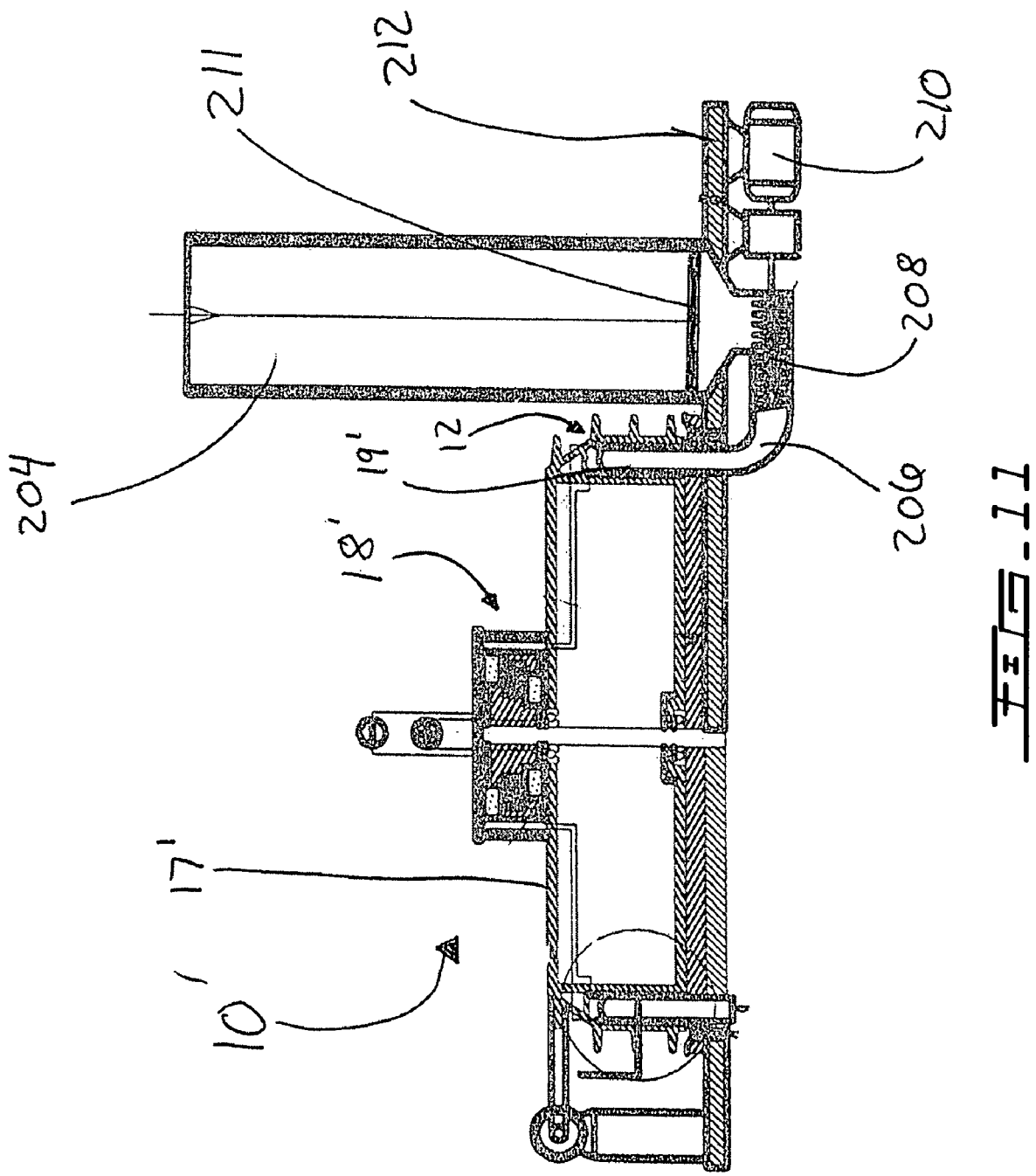
FIG. 11 is a schematic view of an apparatus which is a variant of the apparatus shown in FIG. 1.

As shown in FIG. 11, the apparatus 10' comprises a reservoir 204 which is connected to the inlet 19' by means of a duct 206. The sludge is thus transported from the reservoir 204 to the inlet 19' by means of an Archimedes screw 208 which is powered by a motor 210. The sludge contained in the reservoir 204 is compressed by a piston 211. The apparatus 10' is disposed on a plate 212 (see FIG. 12) and this plate also allows to hold the reservoir 204. It should be noted that the apparatuses 10 and 10' (see FIG. 11) are similar. The apparatus 10 can also be provided with a reservoir 204 (see FIG. 11).

Figure 13:
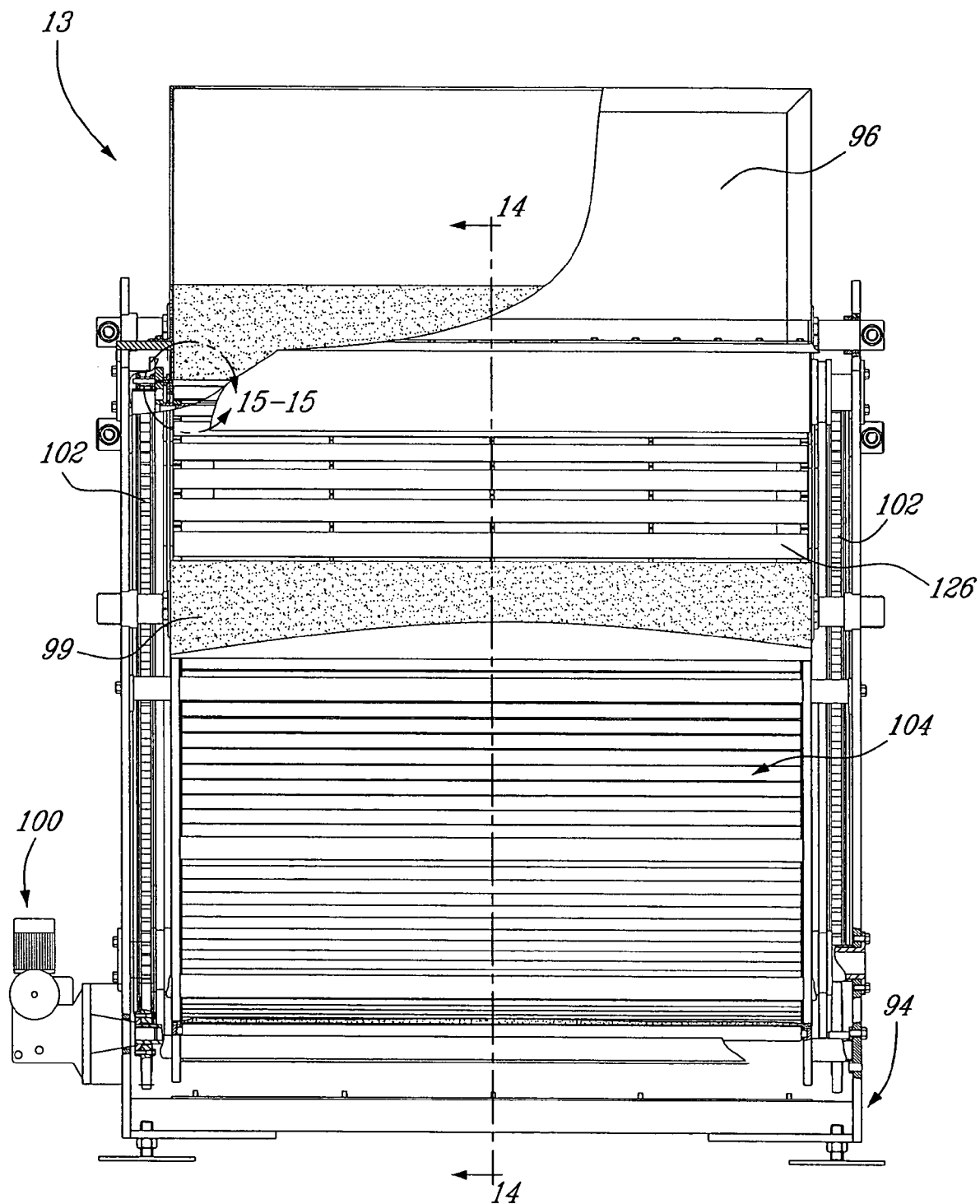
FIG. 13 is a front elevation view of an apparatus for treating sludge according to another preferred embodiment of the invention.

As shown in FIG. 13, the apparatus 13 comprises a support member 94, a reservoir 96 adapted to receive the sludge to be treated, a reservoir 98 adapted to receive effluents (shown in FIG. 14), a reservoir 99 for recovering the treated sludge, a motor 100 and gears 102. The apparatus 13 also comprises a guide member 104.

Figure 14:
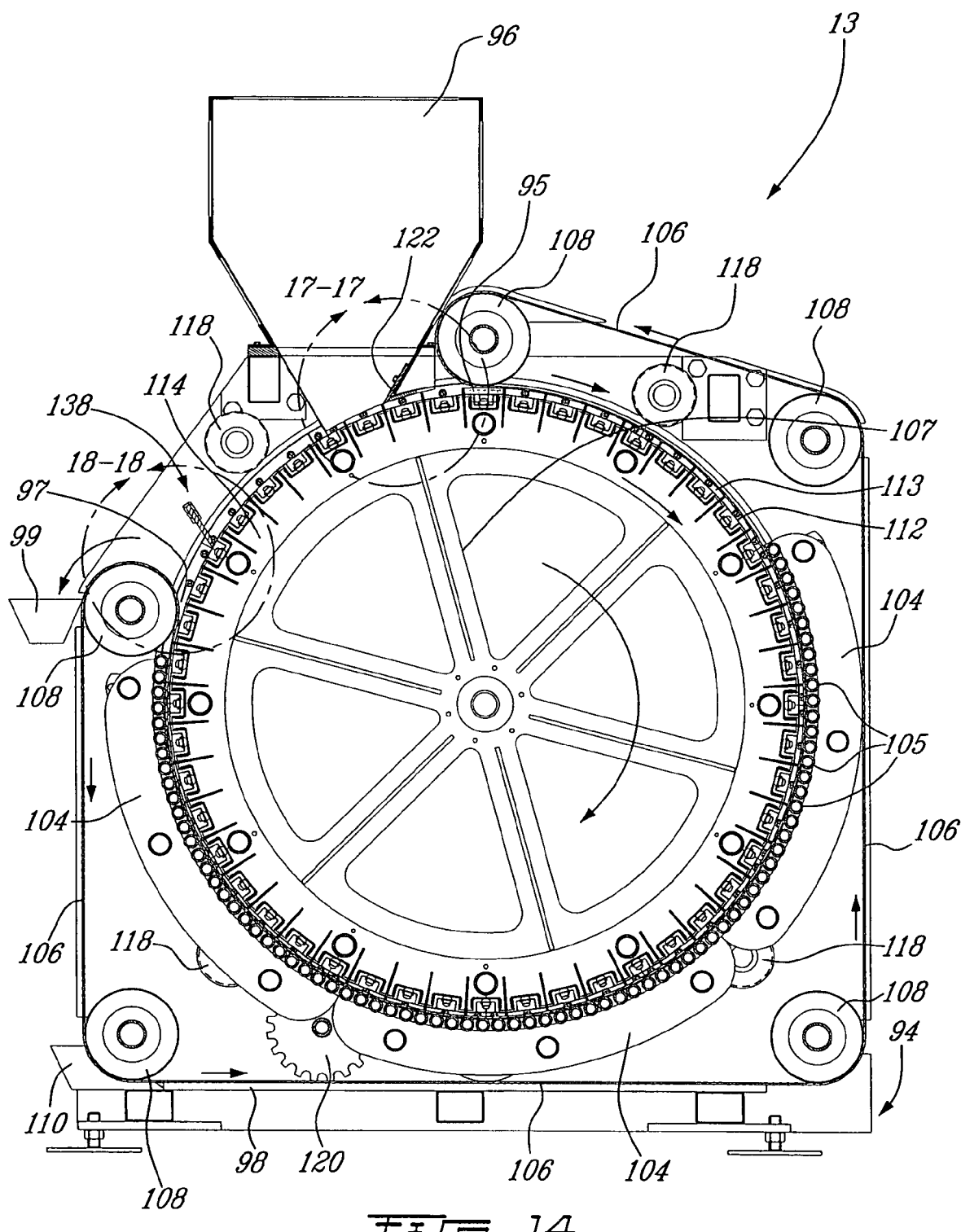
FIG. 14 is a cross section view of the apparatus shown in FIG. 13, taken along the line 14-14.

As shown in FIG. 14, the apparatus 13 comprises an inlet 95, an outlet 97, and a cathode 106 which is in the form of a belt mounted on drive rollers 108. The apparatus also comprises a scraper 110 for cleaning the cathode 106. An anode 112 is mounted on a rotating wheel 114. The anode 112 is divided in a plurality of cells 116 (see FIG. 15). The anode 112 is also guided by drive rollers 118. The guide member 104 comprises a plurality of rollers 105 which permit to reduce the distance between the cathode 106 and the anode 112. The cathode 106 and anode 112 define a space 113 therebetween. As it can be seen from FIG. 14, the distance between the electrodes 106 and 112 is decreasing from the inlet 95 to the outlet 97. The rollers 105 force the cathode 106 to be closer to the anode 112, thereby generating a decreasing volume between the two electrodes 106 and 112. The movement of rotation is imparted to the wheel 114 by gears 102 and 120. The reservoir 96 also comprises means for uniformly distributing the sludge into the cells such as a regulator 122. In fact, this regulator uniformly distributes the untreated sludge on the anode 112. The apparatus 13 also comprises a reservoir 99 for recovering the treated sludge.

Figure 15:
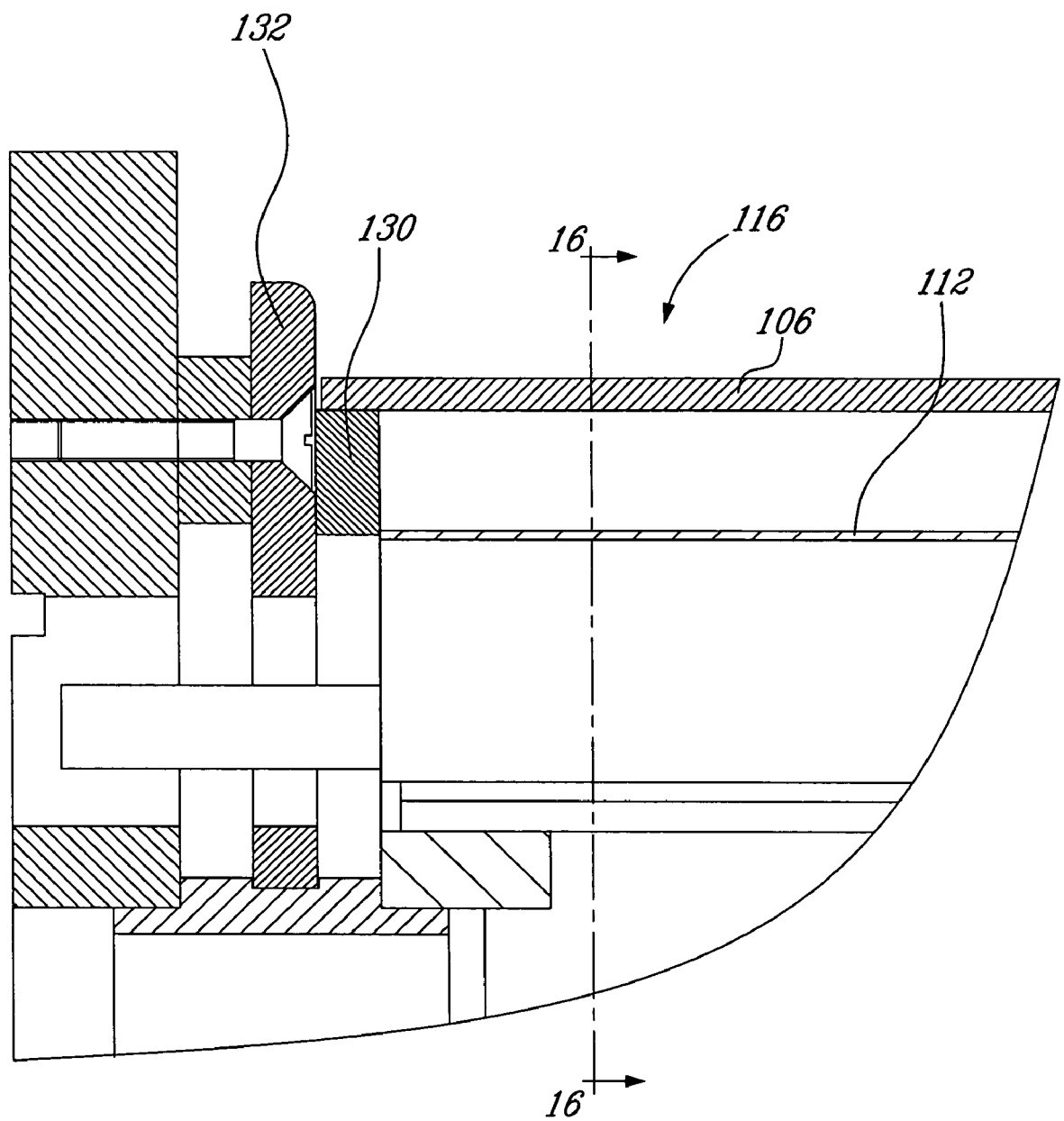
FIG. 15 is an enlarged view of the apparatus shown in FIG. 13, taken inside the line 15-15.

As shown in FIG. 15, the apparatus comprises movable walls 130 and immovable walls 132.

Figure 16:
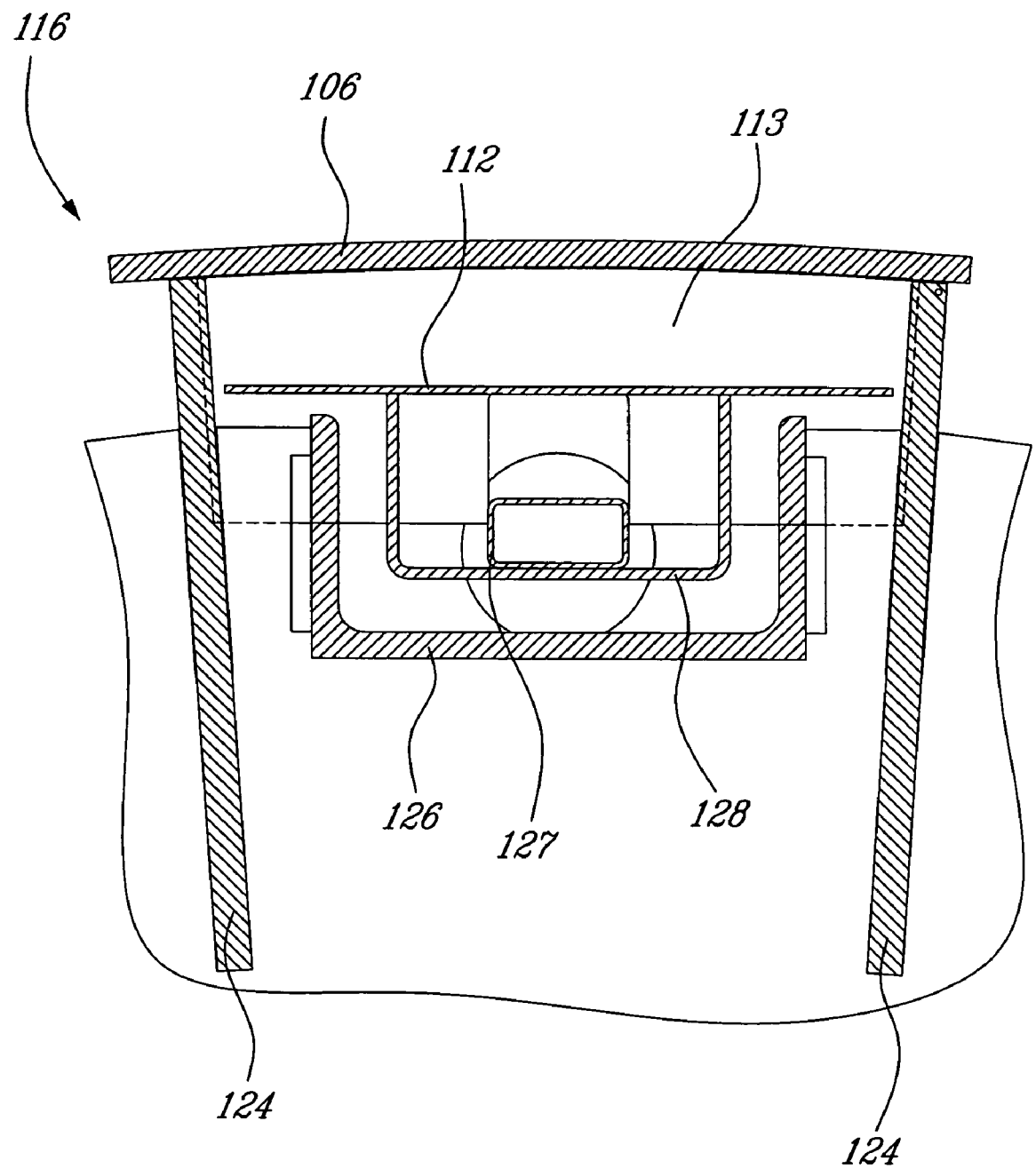
FIG. 16 is a cross section view of a cell of the apparatus shown in FIG. 14.

As shown in FIG. 16, the cell 116 comprises the cathode 106, and the anode 112, the space 113, paddles 124, a supporting element 128 which increase the rigidity of the anode, a mechanism to insure the electrical connection 127 and a support 126 to fix the elements 127 and 128 to the extremities of the apparatus (shown in FIG. 13).

Figure 17:
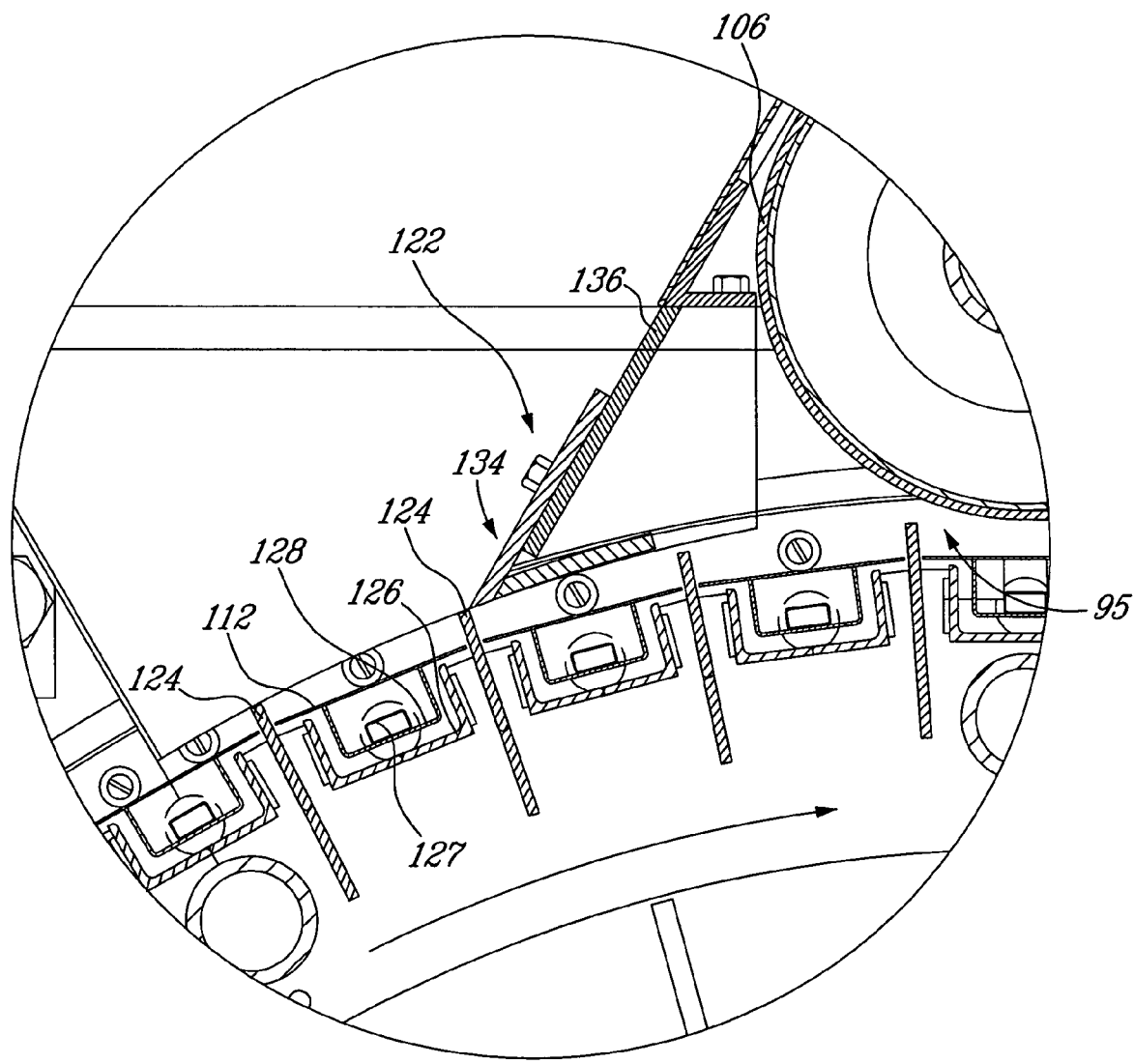
FIG. 17 is an enlarged view of the apparatus shown in FIG. 14, taken inside the line 17-17.

As shown in FIG. 17, the regulator 122 which comprises a scraping member 134 and a supporting member 136, allows distributing uniformly the sludge on the anode 112 or in each cell 116. The paddles 124 carry an amount of sludge which is greater than the volume available in the cells, and this exceeding amount of sludge is blocked or stopped by the scraping member 134 and is later inserted in another cell. Thus, the member 134 controls the thickness of the sludge entering in the space 113 or the amount of sludge which is inserted in the space 113.

Figure 18:
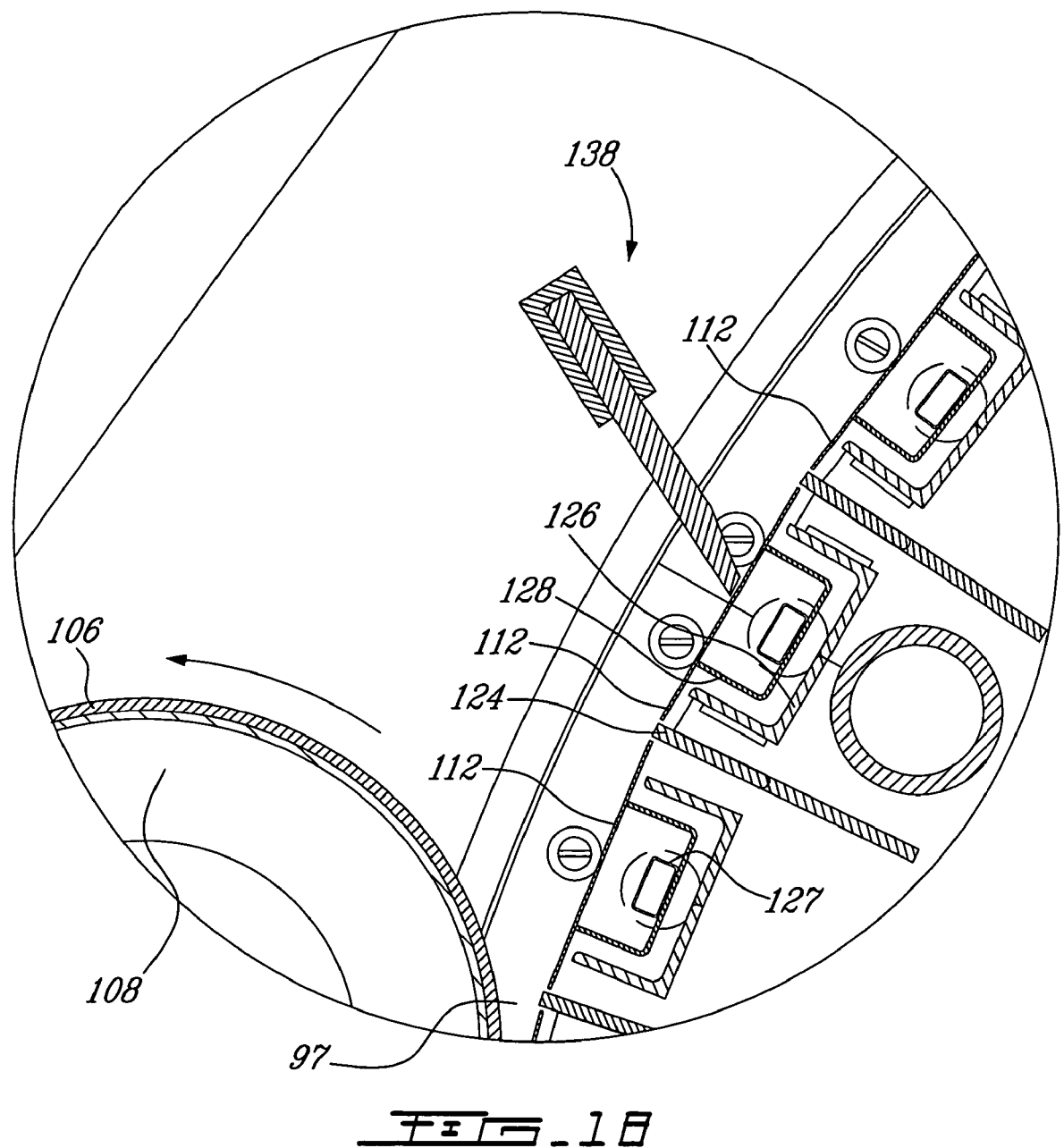
FIG. 18 is an enlarged view of the apparatus shown in FIG. 14, taken inside the line 18-18.

As shown in FIG. 18, the scraper 138 which is disposed adjacently to the anodes 112 permits to remove the sludge from the latter so that the sludge is recovered in the reservoir 99 (see FIG. 14).

In the apparatuses 10, 11, and 13, the sludge during the treatment is in constant contact with the whole surface of the electrodes defining the spaces 50, 92 and 113, respectively.

When using the apparatus 10 or 10' (see FIGS. 2, 11 and 12), the reservoir 204 is first filled with sludge. Then, the sludge is compressed by the piston 211 and pushed through the duct 206 by means of the Archimedes screw 208 in order to reach the inlet 19 and then, the space 50. As indicated above, the space 50 is comprised between the electrodes 32 and 34, and above the groove 22. Within the space 50, the sludge is treated by electro-osmosis when submitted to an electric current, and the sludge is also submitted to a movement of rotation in order to dehydrate it. Moreover, the stop 28 compacts the sludge upwardly in order to allow a substantially constant contact between the electrodes 32 and 34, and the sludge. The stop 28 thus partially clogs the space 50, thereby also compacting and exerting pressure on the sludge disposed upstream of the stop 28. At the end of the treatment, the sludge contacts the scraper 30 in order to be removed from the space 50 and evacuated from the apparatus 10 by means of the slot 20.

During such a treatment, the sludge is dehydrated and gases and effluents are generated. In particular, a cathodic effluent is generated at the cathode, and an anodic effluent is generated at the anode. Preferably, the electrode 32 is the cathode and the electrode 34 is the anode. These effluents pass through the orifices 33 of the electrodes 32 and 34 before going through the grooves 37 of the walls 31 or 36 (see FIG. 3). Then, the effluents reach the grooves 24 or 26 where they are evacuated from the apparatus by means of the orifices 49 (see FIG. 3). The orifices 49 of the grooves 24 and 26 can be connected by means of ducts (not shown) to two separate reservoirs or to the same reservoir depending if a user wants to separate or not the anionic and cationic effluents. The gases generated can also be evacuated according to the same way than the effluents, or they can be evacuated by the cover 17.

When using the apparatus 10 or 10', a single switch (not shown) can be used to activate both motors 210 and 210' as well as the power source (not shown) connected to the device 40. Alternatively, each of these systems can be activated separately. The electric current is provided to the conductive surfaces 44 which are in contact with disks 46 and 48. The conductive surfaces 44 can be made of brass and the disks 46 and 48 can be made of aluminum. The springs 51 allow a constant contact between the conductive surfaces 44 and the disks 46 and 48. These disks are fixed and coupled together by means of a support (not shown) which is attached to the cover 17. The disk 46 is connected by wires (not shown) to the electrode 34 and the disk 48 and the electrode 32 are connected together in a similar manner. The rotation of the wall 12 thus generates the rotation of the disks 46 and 48 and therefore, the electrodes 32 and 34 are constantly supplied in electric current by the device 40. Such a device 40 is also used in the apparatus 11.

The operation of apparatus 11 is similar to the operation of apparatus 10. A reservoir similar to reservoir 204 can be connected to the plate 72A and 72B in order to provide the inlet 68 with sludge.

Figure 12:
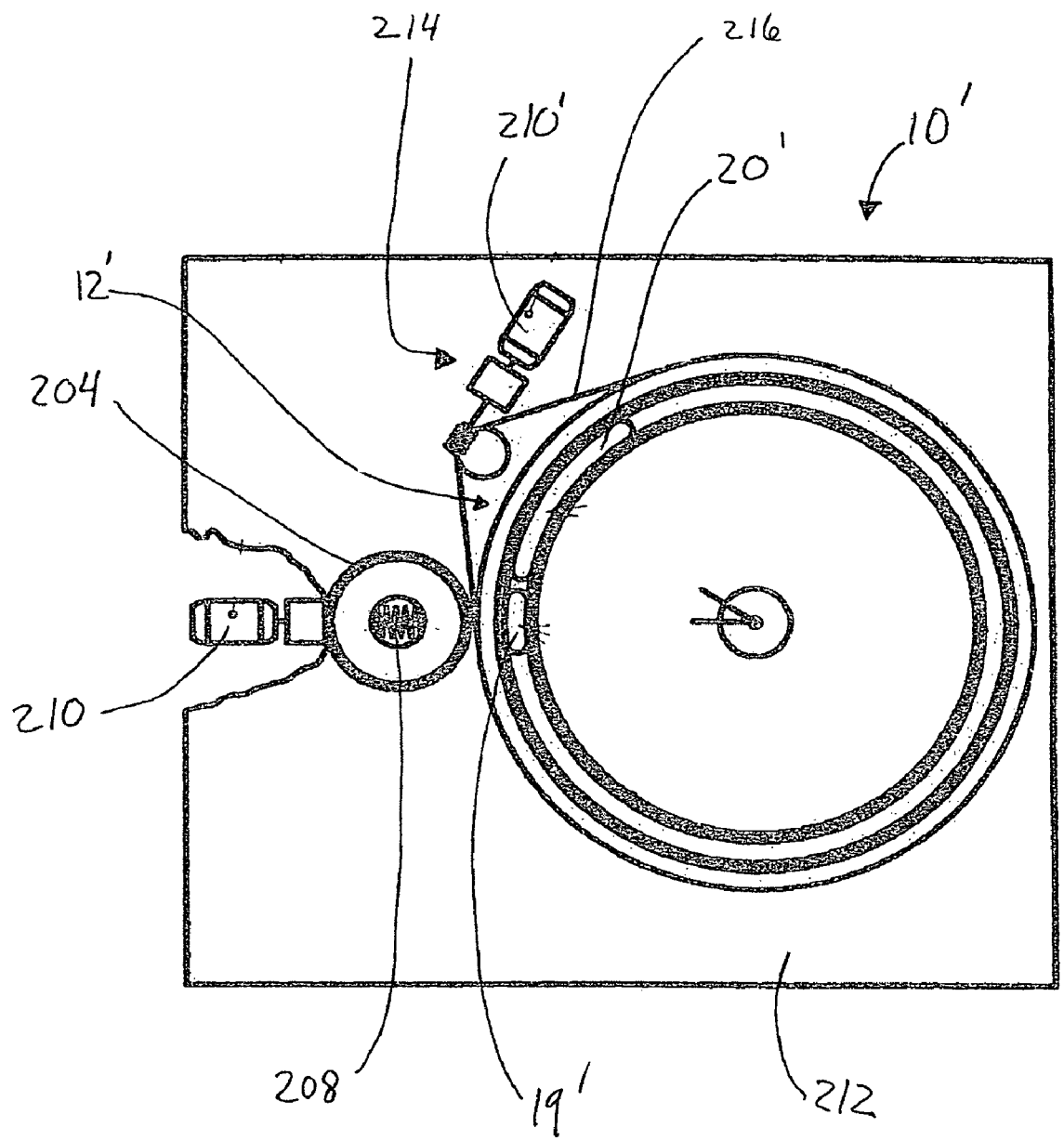
FIG. 12 is a top view of the apparatus shown in FIG. 11.

The gear 78 is connected to a motor similar to the motor 210' by means of a chain 216 (see FIG. 12). When a switch is activated, the movement of rotation is communicated to the electrode 62 and the paddles 66, thus contributing in carrying the sludge within the space 92 wherein the latter is submitted to similar conditions as in apparatus 10. However, in the apparatus 11, compression of the sludge is due to the decreasing volume of the space 92 from the inlet to the outlet or to the decreasing distance between electrodes 60 and 62 (see FIG. 9). The decreasing volume is caused by the different radius of curvature of the walls 56 and 58, as well as the electrode 60. The electrode 60 is preferably the cathode and the electrode 62 is preferably the anode.

During the treatment, the effluents and gases generated at the electrode 60 can pass through the orifices 33 before reaching the grooves 37' (see FIG. 10) of the wall 58 and then be evacuated by the orifices 88 (see FIGS. 8 and 9). Depending on the type of sludge treated, an anionic effluent is generated or not. Thus, the gases generated can be evacuated by the inlet 68 and/or the outlet 70. Optionally, the wall 64 can comprise grooves and orifices (not shown) so as to evacuate any potential effluent generated at the anode. The wall 56 can comprise grooves and orifices 88 to evacuate cathodic effluent. The orifices 88 can be connected by means of ducts (not shown) to a reservoir.

When using the apparatus 13 (see FIGS. 13 to 18), the reservoir 96 is first filled with the sludge to be treated. The motor 100 is activated and the electrodes 106 and 112 are provided by a power source (not shown) in electric current. The sludge is uniformly distributed on the anode 112 by means of the regulator 122. The sludge is thus uniformly distributed in the cells 116 between the paddles 124. Also, the regulator 122 permits to control the thickness of the sludge which is entering within the space 113 of the cells 116. Then, at the inlet 95, the sludge is also contacted by the cathode 106 where the treatment really begins. Thus, an electro-osmosis treatment is applied from the inlet 95 to the outlet 97. The sludge is thus submitted to an electric current and is contacting the electrodes 106 and 112 in order to be dehydrated. During the treatment between the inlet 95 and the outlet 97, the sludge is substantially in constant contact with the electrodes 106 and 112. The cathode 106 comprises orifices (not shown) adapted to evacuate the generated effluents and gases. The anode 112 can also be provided with such orifices. The cathode 106 and the anode 112 are rotated at the same speed around the axis. The sludge then passes through the guide member 104 wherein the distance between the cathode 106 and the anode 112 is decreased, thereby providing a decreasing volume between the electrodes. In the guide member 104, the rollers 105 force the cathode 106 toward the anode 112, thereby compacting the sludge between the electrodes so as to allow a constant contact between the electrodes and the sludge. Such a compression in the guide member 104 also has an effect in the sludge disposed upstream of the guide member 104. The paddles 124 are mounted on a cam system 107 (shown in FIG. 14) so that when the distance between the two electrodes decreases, the portion of the paddles extending between the two electrodes is also reduced. In fact, the paddles are thus moved inwardly toward the rotation axis of the wheel. The effluents generated are thus carried by gravity into the guide member 104 in order to be recovered in the reservoir 98. At the end of the treatment, at the outlet 97, the sludge is removed from the anode 112 by means of the scraper and is carried into the reservoir 99 by means of the cathode 106. Then, the cathode 106 is cleaned by the scraper 110 before returning, in a counterclockwise manner, to the inlet 95 by means of the rollers 108.

The following non-limiting examples further illustrate the invention.

EXAMPLES

For the following examples, the tests have been carried out by using an apparatus having a vertical rotation axis as shown in FIGS. 1 to 4 or having a horizontal rotation axis as shown in FIGS. 5 to 10 or 13 to 18. The apparatus having a vertical rotation axis comprises a rigid plate made of steel having a thickness of 12 mm which is disposed on three adjustable legs. A circular polyethylene plate is used as bottom wall. This plate comprises two circular grooves for evacuating the effluents. These grooves have a depth of 6 mm, and a width of 12 mm. These grooves are provided with orifices. A circular seal is applied to the bottom wall plate made of polyethylene in order to prevent leaking of the sludge. An inlet and an outlet are formed in the steel and polyethylene plates.

This apparatus can contain a volume of 5.3 liters of sludge and has a counterclockwise rotation movement. The inlet is provided with a feeding element in such a manner as to feed the apparatus in accordance with the counterclockwise rotation movement. The apparatus also comprises a vertical reservoir connected by a duct to the inlet. The sludge contained in the reservoir is provided between the electrodes by means of an Archimedes screw disposed within the duct. The steel plate is adapted to support the reservoir, the Archimedes screw, as well as a motor which is activating the Archimedes screw. The reservoir comprises cylindrical walls made of PVC and has a height of 1 meter and a diameter of 20 cm. The reservoir comprises a piston for facilitating the introduction of the sludge into the duct and the reactor. A scraper is disposed adjacently to the outlet of the apparatus so as to facilitate evacuation of the treated sludge.

The polyethylene bottom wall plate also comprises a stop for compacting the sludge. The stop allows maintaining a substantially constant contact between the sludge and the electrodes. The stop is also made of polyethylene and has a thickness of 12 mm. The stop comprises a longitudinal section having a curvature radius. The stop has a length of 100 mm and a height of 10 mm at one end, and of 40 mm at the other end.

The apparatus comprises an anode and a cathode, which are both made of steel. The apparatus also comprises an outer cylindrical wall having a height of 15 cm and a diameter of 65 cm which is connected by its inferior portion to the bottom wall plate. The upper portion of this outer cylindrical wall is connected to a cover. This outer cylindrical wall is made of plastic material. The cover adapted to receive a counterweight and it is also adapted to receive the current distribution device.

The outer cylindrical wall comprises support cylindrical wall made of plastic which supports the cathode. This supporting cylindrical wall comprises grooves which are in communication with the grooves of the bottom plate so as to evacuate a cathodic effluent generated during the treatment. The cathode comprises a plurality of orifices, has a height of 10 cm and a diameter of 65 cm. The cathode is also connected by means of three wires to the electric current distribution device.

The anode is connected to a support cylindrical wall made of plastic which is connected to an inner cylindrical wall. The support cylindrical wall for the anode has a height of 18 cm. This support cylindrical wall also comprises grooves which are connected to the other grooves of the bottom plate so as to evacuate a generated anodic effluent. The anode has a height of 11 cm and a diameter of 60 cm. The upper portion of the inner and outer cylindrical walls are connected together.

The bottom plate also comprises three supporting rods which are extending a few centimeters above the cover. These rods are used as support for the electric current distribution device. This device comprises two aluminum disks having a diameter of 8 cm. The upper disk is connected to the cathode and the lower disk is connected to the anode. Between these two aluminum disks, there is a polyethylene square plate comprising conductive surfaces connected to the cathode and to the anode. These surfaces have a height of 3 cm, a length of 3 cm, and a thickness of 1 cm. These surfaces are provided with springs in order to allow a constant contact with the aluminum disk. Alternatively, the aluminum disk can be made of copper. The plate of the electric current distribution device is immovable with respect to the rotation axis and the aluminum disk rotates at the same speed as the cathode and the anode.

The outside cylindrical wall of the apparatus comprises three wheels for facilitating rotation on the bottom wall plate. This outer cylindrical wall also comprises grooves which are adapted to receive a chain or a belt for transmission of the rotation movement.

A chain made of metal connects together the groove of the outside cylindrical wall and a motor for transmission of a movement of rotation from the motor to the apparatus. The two motors and the electric current distribution device can be connected to a single switch.

Experiments

In examples 1 and 2 the sludge has been treated in an apparatus having a vertical rotation axis, the reservoir has first been filled with a volume of about 30 liters of sludge. Then, the apparatus has been activated in order to submit the sludge to an electrical current and by imparting to it a rotation movement. At the beginning of the treatment, the electrical current had an intensity of 15 A and a voltage of 20 volts. The apparatus was connected to a power source generating a direct current of a maximum voltage of 30 volts and a maximum intensity of 80 A. The power of the source was 2400 watts. The voltage was constant and the intensity of the current was increased progressively. The rotation speed of the apparatus was from 1 to 2 rounds per hour during 15 to 30 minutes and then, the sludge was evacuated. For each liter of sludge, a volume of about 0.3 liter of effluent, including cationic and anionic effluents, has been recovered. Depending of the sludge, the latter can be treated more than one time.

In the example 3, the sludge has been treated with an apparatus having a horizontal rotation axis, and wherein the electrode is divided in a plurality of different cells. For the test 2, table 5, the cell contains 9 kg of sludge before treatment, and 4 kg after treatment. For the test 1, table 6, the weight of the sludge in the cells before treatment is 16 kg and 8.25 kg after treatment.

Example 1

A municipal waste sludge has been treated as indicated above and then analyzed. The results are shown in Tables 1 and 2.

TABLE 1

| Pollutants | Units | Untreated sludge | Treated sludge | Abatement rate (%) |
|---|---|---|---|---|
| fecal coliforms | NPP/gbs | >96000 | <6 | 99.99 |
| salmonellae | NPP/4 gbs | 10 | <3 | 70 |

TABLE 2

| Sludge | Ph | Dryness (%) | Humidity (%) |
|---|---|---|---|
| Untreated sludge | 7.10 | 16.60 | 83.36 |
| Treated sludge | 5.70 | 37.00 | 63.02 |

Example 2

Another municipal waste sludge has been treated as indicated above and then analyzed. The results are shown in Tables 3 and 4.

TABLE 3

| Pollutants | Units | Untreated sludge | Treated sludge | Abatement rate (%) |
|---|---|---|---|---|
| fecal coliforms | NPP/gbs | 11000 | <9 | 99.99 |
| salmonellae | NPP/4 gbs | 1.7 | <0.4 | 76 |

TABLE 4

| Sludge | Ph | Dryness (%) | Humidity (%) |
|---|---|---|---|
| Untreated sludge | 6.51 | 14.00 | 86.00 |
| Treated sludge | 5.47 | 41.00 | 59.00 |

As it can be seen form Tables 1 and 3, the processes and apparatuses of the invention can provide a bactericide effect to the treated sludge, thereby decontaminating the sludge from these pollutants.

Example 3

A further municipal waste sludge has been treated as indicated above and then analyzed. The results are shown in Tables 5 to 7. In Table 5 the results of a single cell are shown. In Table 6, the results for two cells are shown. Finally, in Table 7, the results for 36 cells are shown.

TABLE 5

| Tests | Voltage (average) (V) | Current (average) (A) | Dryness (initial) (%) | Dryness (final) (%) |
|---|---|---|---|---|
| Test 1 | 33.00 | 27.48 | 14.20 | 39.50 |
| Test 2 | 37.94 | 72.36 | 13.32 | 40.97 |

TABLE 6

| Tests | Voltage (average) (V) | Current (average) (A) | Dryness (initial) (%) | Dryness (final) (%) |
|---|---|---|---|---|
| Test 1 | 33 | 186 | | |
| 1$^{st}$ cell | | | 12.40 | 33.67 |
| 2$^{nd}$ cell | | | 12.40 | 34.69 |
| Test 2 | 33 | 200 | | |
| 1$^{st}$ cell | | | 12.32 | 37.21 |
| 2$^{nd}$ cell | | | 12.32 | 35.00 |

TABLE 7

| Voltage (average) (V) | Current (average) (A) | Dryness (initial) (%) | Dryness (final) (%) |
|---|---|---|---|
| 30 | 1995.65 | 16 | 34 |

The processes and apparatus of the invention can be useful for treating organic and/or inorganic sludge such as colloidal sludge, sludge from pulp and paper industries, sludge issued from a chemical or biological treatment, sludge from a dairy, sludge from a slaughterhouse, sludge from liquid or semi-liquid manure such as pork manure, and sludge from wastewater treatment plant. Thus, these apparatuses and process can be used in industrial applications as well as for protecting environment.

It has thus been demonstrated that the processes and apparatus of the invention are quite useful for treating various type of sludge. It also has been shown these processes and apparatus are simple and easy to use. Moreover, they do not necessitate use of additives or filters and they permit to reduce drops of potential at the electrodes, preferably the anode. It has been found that by providing a constant contact between the whole surface of the electrodes (the surface which is adjacent to the sludge) and the sludge, and by imparting a rotation movement to the sludge while compacting it, optimal results are obtained. Moreover, it also has been found that when varying the pressure according to the sludge consistency, (i.e. increasing the pressure when the sludge consistency is increasing) very interesting results are also obtained.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. An apparatus for treating sludge comprising:
   electrodes including at least one anode and at least one cathode, said electrodes defining therebetween a space adapted to receive the sludge so as to submit said sludge disposed within said space to an electric current, thereby dehydrating said sludge and generating an effluent;
   an inlet for receiving the sludge and an outlet for evacuating the treated sludge, said inlet and outlet being in communication with said space;
   compression means for compacting the sludge so as to permit a contact substantially constant between said electrodes and said sludge when the sludge is submitted to the electric current;
   evacuation means for evacuating the effluent; and
   activating means for imparting a rotation movement to said sludge so that the sludge is in rotation around a rotation axis defined by the apparatus while being submitted to the electric current and being compacted,
   wherein one of said electrodes has the form of an endless belt which is moved around a portion of said axis, said other electrode having a cylindrical shape, being rotatably mounted within said apparatus, and being disposed between said axis and said belt,
   and wherein said cylindrical electrode comprises a plurality of cells isolated from one another and adapted to receive sludge, each cell comprising two paddles made of an electrically insulating material and defining side walls of each cell, each cell also comprises a metal plate acting as an electrode and bottom wall of said cell, and two other side walls, said paddles are sealingly engaging said belt and said belt defines a top wall of each cell, in such a manner that when the sludge is being submitted to the electric current and being compacted, the sludge contained in a cell is not contacting the sludge contained in an adjacent cell.

2. The apparatus of claim 1, wherein said endless belt is the cathode and said cylindrical electrode is the anode.

3. The apparatus of claim 1, wherein said paddles are adjustably mounted on a rod defining said axis so as to modify the size of each cell, said paddles being adjusted in accordance with the decreasing volume of said space between the two electrodes, the length of a portion of each paddle extending between said electrodes varying according to the distance between said two electrodes.

4. The apparatus of claim 3, wherein said paddles are adjustably mounted on said rod by means of a cam system.

5. The apparatus of claim 1, wherein said compression means is characterized in that said space between said electrodes defines a decreasing volume from said inlet toward said outlet.

6. The apparatus of claim 1, further comprising means for uniformly distributing the sludge into said cells.

7. An apparatus for treating sludge comprising
   electrodes including at least one anode and at least one cathode, said electrodes defining therebetween a space adapted to receive the sludge, and at least one of said electrodes being rotatably mounted within said apparatus so as to rotate around an axis of rotation;
   an inlet for receiving the sludge and an outlet for evacuating the treated sludge, said inlet and outlet being in communication with said space;
   wherein said space has a decreasing volume from said inlet to said outlet so as to compress said sludge when it is rotated around the axis from said inlet to said outlet, and to permit a substantially constant contact between said electrodes and said sludge when submitting the sludge to an electric current for dewatering it; and
   wherein said apparatus is also adapted to impart mechanical pressure to said sludge, said mechanical pressure being adjustable at various stages of treatment and wherein said mechanical pressure varies according to sludge consistency, said pressure increasing when sludge consistency is increasing.

8. The apparatus of claim 7, wherein said mechanical pressure is imparted by at least one guide member disposed adjacently to said endless belt, said guide member contacting said belt so as to permit to reduce the distance between the electrodes from said inlet toward said outlet.

9. A process for treating sludge comprising:
   introducing said sludge into a space defined between electrodes including at least one anode and at least one cathode, said anode and said cathode being disposed in an apparatus defining a rotation axis; and
   submitting the sludge to an electric current so as to dehydrate said sludge, and imparting a rotation movement to the sludge around the axis while compacting said sludge so as to permit a substantially constant contact between the sludge and the electrodes when dewatering said sludge; and adjusting mechanical pressure imparted to said sludge according to sludge consistency during various stages of said process, said pressure increasing when the sludge consistency is increasing.

10. The process of claim 9, wherein the sludge, after said treatment, has a content of fecal coliforms which is at least 99.99% inferior as compared to the content of fecal coliforms of the sludge before said treatment.

11. The process of claim 9, wherein the sludge, after said treatment, has a content of salmonellae which is at least 70% inferior as compared to the content of salmonellae of the sludge before said treatment.

\* \* \* \* \*